(12) United States Patent
Morgan et al.

(10) Patent No.: US 8,302,903 B2
(45) Date of Patent: Nov. 6, 2012

(54) AIRCRAFT ATTITUDE CONTROL CONFIGURATION

(75) Inventors: Brian Herman Morgan, Ootsburg, WI (US); David LeRoy Hagen, Goshen, IN (US)

(73) Assignee: Morgan Aircraft, LLC, Ootsburg, WI (US)

( * ) Notice: Subject to any disclaimer, the term of this patent is extended or adjusted under 35 U.S.C. 154(b) by 0 days.

(21) Appl. No.: 13/324,713

(22) Filed: Dec. 13, 2011

(65) Prior Publication Data

US 2012/0145834 A1 Jun. 14, 2012

Related U.S. Application Data

(62) Division of application No. 12/507,573, filed on Jul. 22, 2009, now Pat. No. 8,074,925, which is a division of application No. 11/595,525, filed on Nov. 9, 2006, now Pat. No. 7,581,696.

(60) Provisional application No. 60/734,950, filed on Nov. 9, 2005.

(51) Int. Cl.
*B64C 5/10* (2006.01)

(52) U.S. Cl. ............... 244/90 R; 244/194; 244/45 A

(58) Field of Classification Search ............... 244/194, 244/90 R, 45 A
See application file for complete search history.

(56) References Cited

U.S. PATENT DOCUMENTS

| | | |
|---|---|---|
| 2,461,435 A | 2/1949 | Neumann et al. |
| 3,017,139 A | 1/1962 | Binder |
| 3,061,242 A | 10/1962 | Zurawinski et al. |
| 3,083,935 A | 4/1963 | Piasecki |
| 3,120,362 A | 2/1964 | Curtis et al. |
| 3,388,878 A | 6/1968 | Peterson et al. |
| 4,449,703 A | 5/1984 | Robinson |
| 5,059,094 A | 10/1991 | Robinson et al. |
| 5,094,412 A | 3/1992 | Narramore |
| 5,098,034 A * | 3/1992 | Lendriet ................. 244/39 |
| 5,103,404 A * | 4/1992 | McIntosh ............ 318/568.22 |
| 5,114,096 A | 5/1992 | Wernicke |
| 5,244,167 A | 9/1993 | Turk et al. |
| 5,295,643 A | 3/1994 | Ebbert et al. |
| 5,381,985 A | 1/1995 | Wechsler et al. |
| 5,671,051 A | 9/1997 | Wright, Jr. |
| 5,707,029 A | 1/1998 | McIntosh |
| 5,758,844 A | 6/1998 | Cummings |
| 5,765,783 A | 6/1998 | Albion |

(Continued)

OTHER PUBLICATIONS

International Search Report and Written Opinion, International Search Authority/United States, Aug. 25, 2008 (nine pages).

(Continued)

*Primary Examiner* — Timothy D Collins
*Assistant Examiner* — Medhat Badawi
(74) *Attorney, Agent, or Firm* — Maginot, Moore & Beck, LLP

(57) ABSTRACT

Control surfaces in an aircraft attitude control configuration provide attitude control for an aircraft at hover or low air speed conditions. The aircraft attitude control configuration includes thrusters mounted to an aircraft, a first control surface kinematically coupled to the aircraft downstream of a first thruster to enable a first vector force to be generated by a portion of thrusted air from the first thruster on the first control surface, and a second control surface kinematically coupled to the aircraft of a second thruster. The control surfaces are displaced symmetrically a longitudinal axis of the aircraft. The control surfaces are independently and differentially movable with respect to each other to enable generation of a second vector force by a portion of thrusted air from the second thruster on the second control surface.

20 Claims, 10 Drawing Sheets

U.S. PATENT DOCUMENTS

| | | | |
|---|---|---|---|
| 5,873,545 | A | 2/1999 | Kapin et al. |
| 5,890,441 | A | 4/1999 | Swinson et al. |
| 6,270,038 | B1 | 8/2001 | Cycon et al. |
| 6,276,633 | B1 | 8/2001 | Balayn et al. |
| 6,343,768 | B1 | 2/2002 | Muldoon |
| 6,367,736 | B1 | 4/2002 | Pancotti |
| 6,431,494 | B1 | 8/2002 | Kinkead et al. |
| 6,460,802 | B1 | 10/2002 | Norris |
| 6,554,229 | B1 | 4/2003 | Lam et al. |
| 6,659,394 | B1 * | 12/2003 | Shenk .................. 244/7 C |
| 6,722,616 | B2 | 4/2004 | Fukada |
| 6,843,447 | B2 | 1/2005 | Morgan |
| 6,892,982 | B2 | 5/2005 | Clark |
| 6,896,221 | B1 | 5/2005 | Einarsson |
| 7,097,427 | B2 | 8/2006 | Kuhns et al. |
| 7,494,094 | B2 | 2/2009 | Good et al. |
| 7,523,603 | B2 * | 4/2009 | Hagen et al. ............ 60/39.55 |
| 2003/0077173 | A1 * | 4/2003 | Franchet et al. .......... 416/30 |
| 2003/0127569 | A1 | 7/2003 | Bacon et al. |
| 2003/0136873 | A1 | 7/2003 | Churchman |
| 2005/0116095 | A1 | 6/2005 | Cline et al. |
| 2005/0151003 | A1 | 7/2005 | Churchman |
| 2006/0032970 | A1 | 2/2006 | Allen |
| 2006/0097107 | A1 | 5/2006 | Parks et al. |
| 2007/0071566 | A1 * | 3/2007 | Young et al. .................. 409/234 |
| 2007/0095140 | A1 * | 5/2007 | Kollgaard ....................... 73/633 |
| 2007/0215748 | A1 | 9/2007 | Robbins et al. |
| 2007/0267548 | A1 | 11/2007 | Ciholas et al. |
| 2007/0271008 | A1 | 11/2007 | Ciholas et al. |

OTHER PUBLICATIONS

Hirschberg, Michael J., An Overview of the History of Vertical and/or Short Take-Off and Landing (V/STOL) Aircraft, 2001-00-00, Centra Technology Inc., www.vstol.org (74 pages).

* cited by examiner

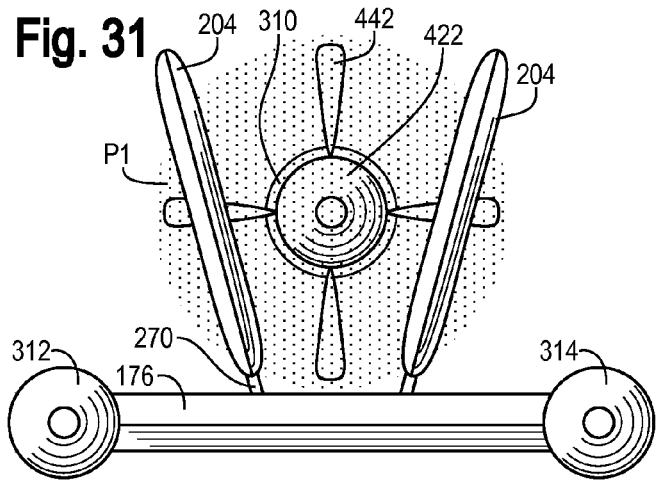
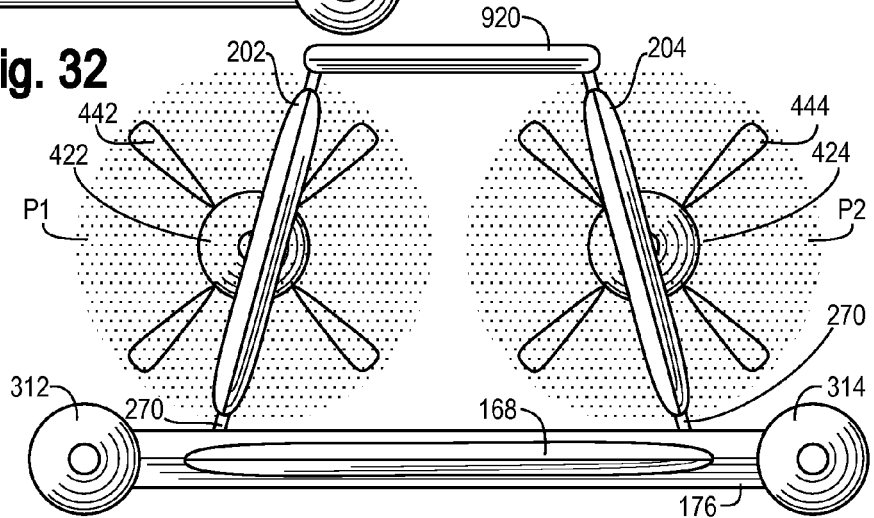
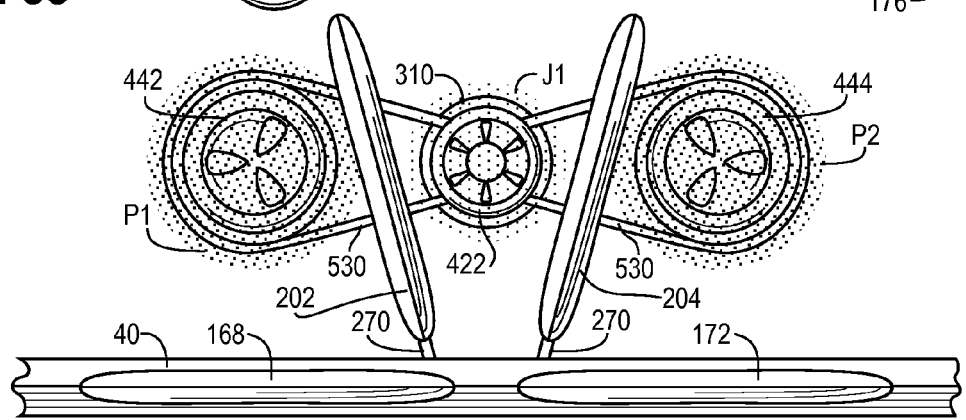
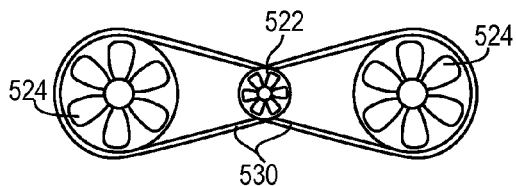

AIRCRAFT ATTITUDE CONTROL CONFIGURATION

PRIORITY CLAIM

This application claims priority from U.S. patent application Ser. No. 12/507,573, which was filed on Jul. 22, 2009, is entitled "Aircraft Attitude Control Configuration," and will issue as U.S. Pat. No. 8,074,925 on Dec. 13, 2011. This application claims further priority from U.S. patent application Ser. No. 11/595,525, which was filed on Nov. 9, 2006 and entitled "Aircraft Attitude Control Configuration," and issued as U.S. Pat. No. 7,581,696 on Sep. 1, 2009, which claims priority from U.S. provisional patent application bearing Ser. No. 60/734,950, which is entitled "Empennage Control" and was filed on Nov. 9, 2005.

FIELD OF INVENTION

The present invention relates to control of a powered aircraft, and more specifically to control of an aircraft in hover or slow relative wind movement.

BACKGROUND

The attitude or vector spatial orientation of an aircraft is typically controlled using a plurality of fluid diverting control surfaces. Air flowing over or against these control surfaces during flight generates fluid forces on those surfaces. These forces and their corresponding moments about the aircraft's center of mass help control the aircraft's attitude. Most aircraft experience low fluid forces on their control surfaces in Vertical Take Off and Landing aircraft, Short Take Off and Landing, and/or Short/Vertical Takeoff and Landing aircraft (VTOL, STOL and/or S/VTOL) typically do not experience strong fluid forces on their control surfaces during hover or low speed operation.

Many aircraft utilize turbojet thrusters. Positioning control surfaces within the hot fluid plumes produced by these thrusters requires the use of heat resistant materials. The costs of these materials significantly add to the expense of an aircraft's manufacture. Additionally, operating a control surface in the hot air plume of a thruster reduces the operating life and increases the maintenance costs of the control surfaces. Aircraft prime movers typically comprise propellers or fans to accelerate more air flow and reduce thrust fluid velocity relative to the surrounding air. However, fan diameters and area are typically limited by ground clearance.

SUMMARY OF THE INVENTION

An aircraft attitude control configuration enables control surfaces to provide attitude control for an aircraft at hover or low air speed conditions. The aircraft attitude control configuration includes a plurality of thrusters mounted to an aircraft for thrusting air, a first control surface kinematically coupled to the aircraft at a position downstream of a first thruster to enable a first vector force to be generated by a portion of the thrusted air from the first thruster on the first control surface, and a second control surface kinematically coupled to the aircraft at a position downstream of a second thruster, the first and the second control surfaces being displaced symmetrically on opposite sides of a longitudinal axis of the aircraft, the second control surface being configured to be independently and differentially movable with respect to the first control surface to enable a second vector force to be generated by a portion of the thrusted air from the second thruster on the second control surface.

In another embodiment, the aircraft configuration includes a plurality of thrusters mounted to an aircraft for thrusting air, a first control surface, and a second control surface, the first and the second control surfaces being kinematically coupled to the aircraft at a position downstream of the thruster and displaced symmetrically on opposite sides of a longitudinal axis, the first and the second control surfaces being configured to be independently and differentially movable with respect to one another to enable a portion of the thrusted air from the plurality of thrusters to generate a first vector force on the first control surface and another portion of the thrusted air from the plurality of thrusters to generate a second vector force on the second control surface.

BRIEF DESCRIPTIONS OF THE DRAWINGS

Having thus summarized the general nature of the invention and some of its features and advantages, certain preferred embodiments and modifications thereof will become apparent to those skilled in the art from the detailed description herein having reference to the figures that follow, each having features and advantages in accordance with one embodiment of the invention, of which:

Figure 7:
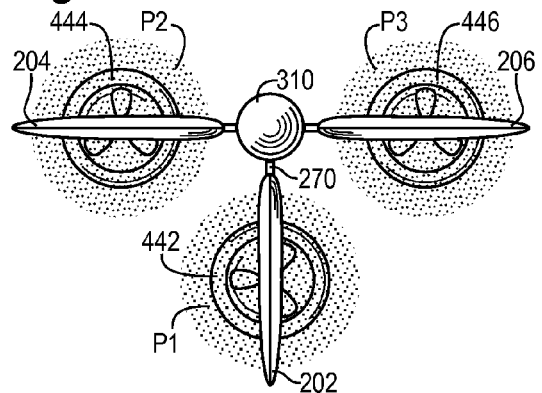

FIG. 7 schematically shows a tail elevation view of an upright T empennage with a Yaw and two left and right differential roll-pitch control surfaces in respective thrust plumes downstream of three fluid thrusters.

Figure 8:
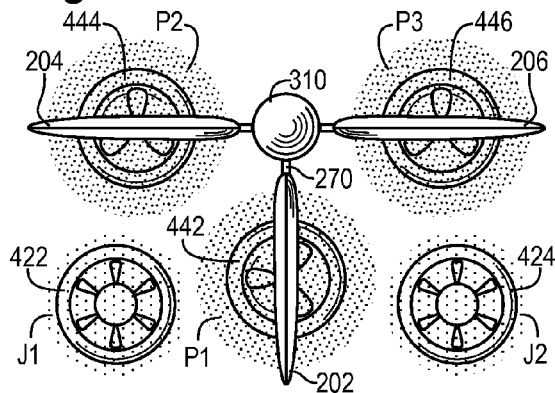

FIG. 8 schematically shows a tail elevation view of an upright T empennage configuration with a Yaw and two left and right differential roll-pitch control surfaces in respective thrust plumes downstream of three fluid thrusters, with two left and right lower thrusters.

Figure 9:
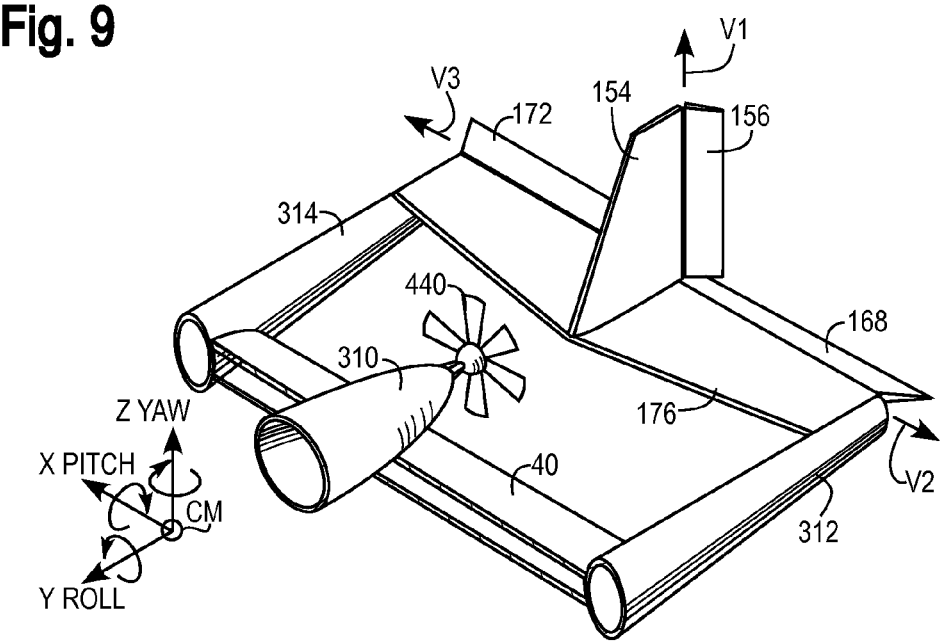

FIG. 9 schematically shows a perspective view of an inverted T twin boom empennage configuration with a Yaw and two differential left and right roll-pitch elevators on vertical and horizontal stabilizers downstream of a fluid thruster, oriented for clockwise roll.

Figure 10:
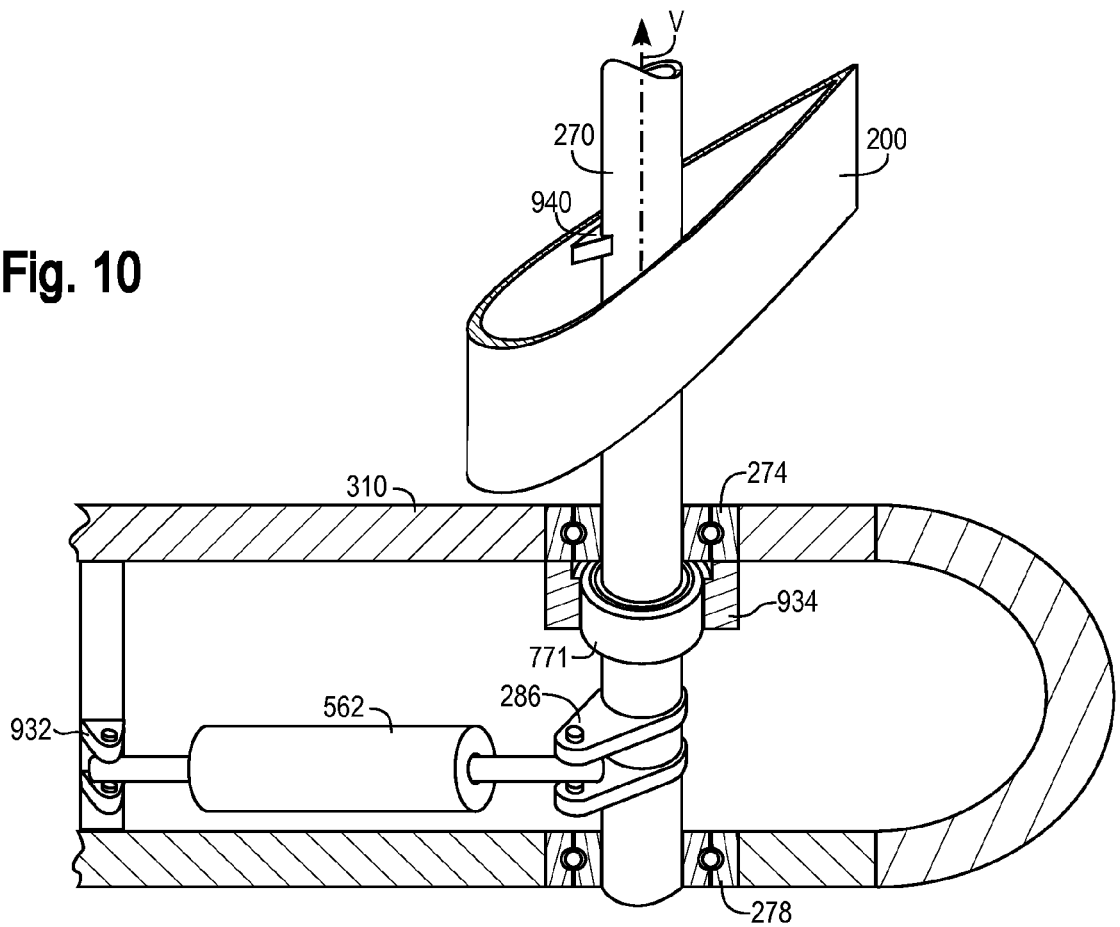

FIG. 10 schematically shows a actuator driving a pivotably mounted stabilator arm supporting a stabilator.

Figure 11:
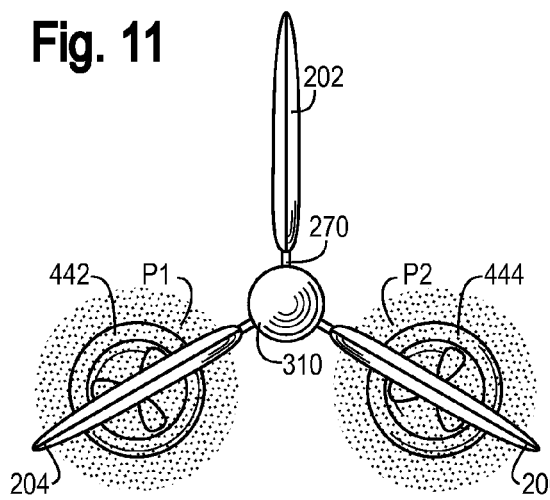

FIG. 11 shows a schematic tail elevation view of an inverted Y empennage configuration with two left and right roll-pitch control surfaces in respective thrust plumes of two upstream fluid thrusters, and a Yaw control surface.

Figure 12:
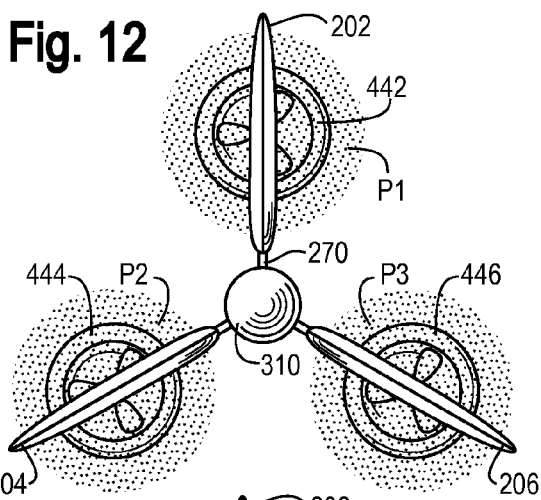

FIG. 12 shows a schematic tail elevation view of an inverted Y empennage configuration with three control surfaces in respective thrust plumes of three upstream fluid thrusters.

Figure 13:
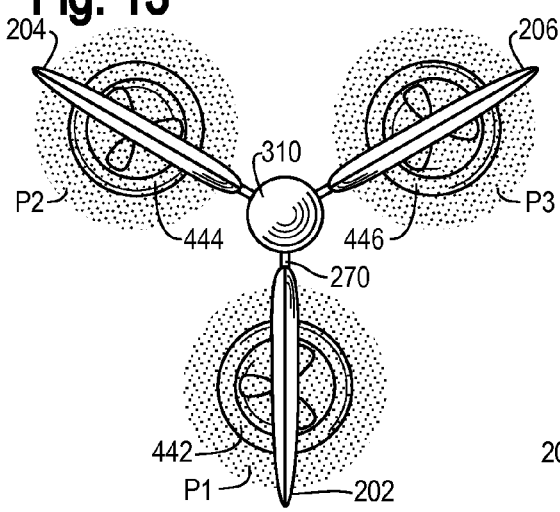

FIG. 13 shows a schematic tail elevation view of an upright Y empennage configuration with three control surfaces in respective thrust plumes of three upstream fluid thrusters.

Figure 14:
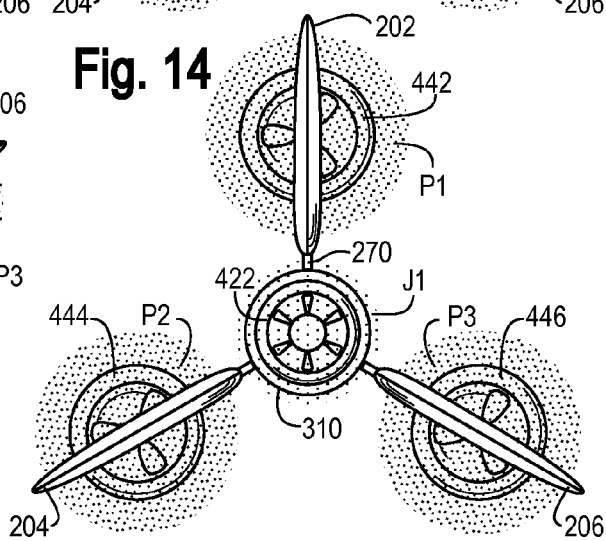

FIG. 14 shows a schematic tail elevation view of an inverted Y empennage configuration with three control surfaces in respective thrust plumes of three upstream fluid thrusters, with a central thruster.

Figure 15:
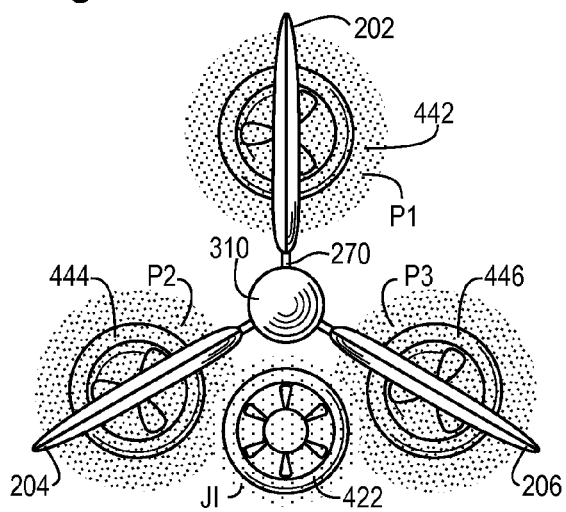

FIG. 15 shows a schematic tail elevation view of an inverted Y empennage configuration with three control surfaces in respective thrust plumes of three upstream fluid thrusters with a lower thruster.

Figure 16:
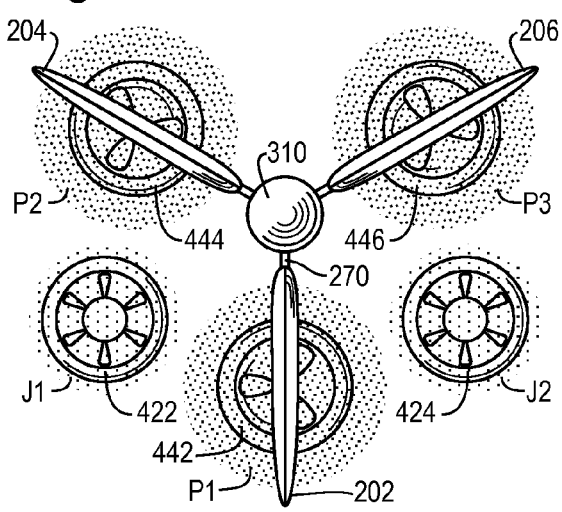

FIG. 16 shows a schematic tail elevation view of an upright Y empennage configuration with three control surfaces in respective thrust plumes of three upstream fluid thrusters, with two lower thrusters.

Figure 17:
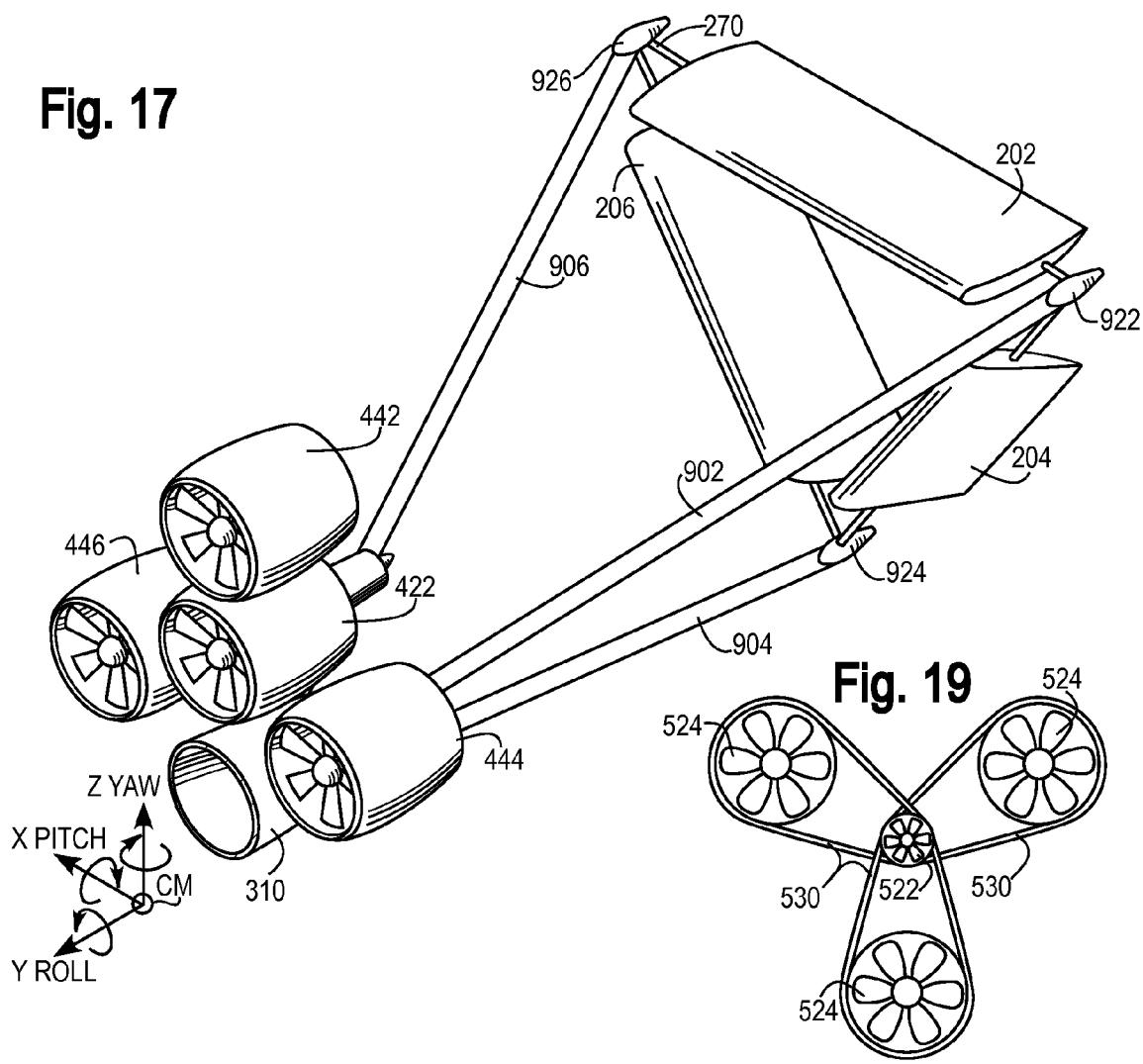

FIG. 17 shows a schematic perspective view of an inverted Delta empennage configuration with three control surfaces respectively downstream of three fluid thrusters, with a central thruster.

Figure 18:
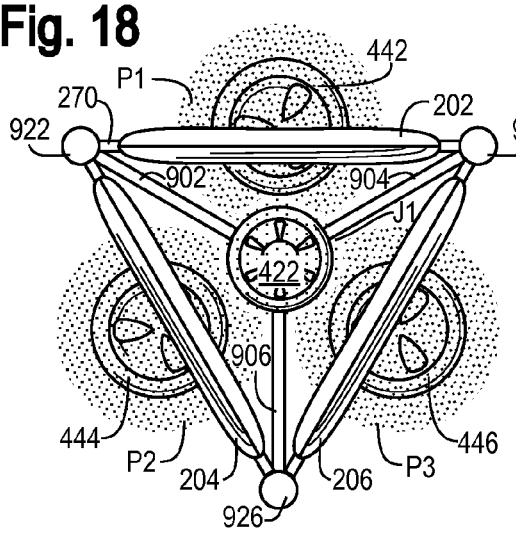

FIG. 18 shows a schematic tail elevation view of an inverted Delta empennage configuration with three control surfaces in respective thrust plumes of three upstream fluid thrusters, with a central thruster.

Figure 19:
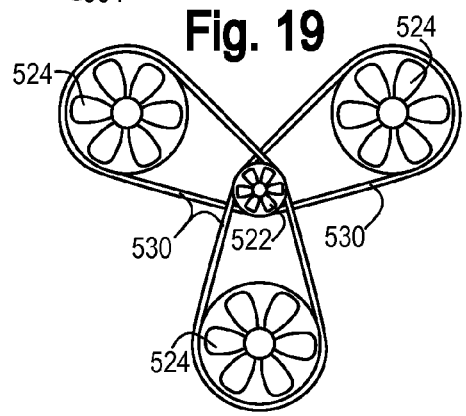

FIG. 19 shows a schematic elevation view of a belt drive system driving three fluid thrusters about a central prime mover.

Figure 20:
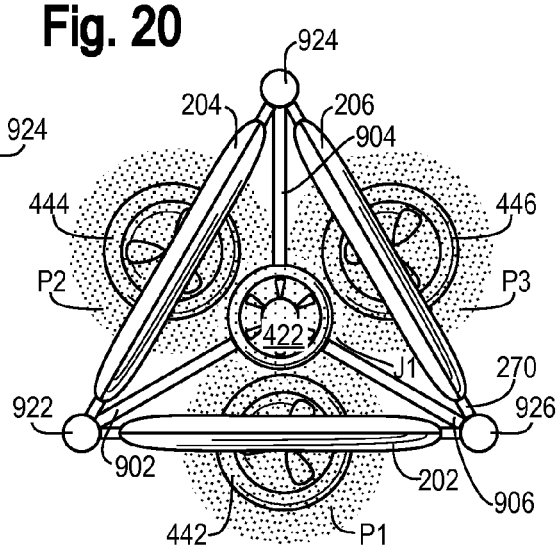

FIG. 20 shows a schematic tail elevation view of an upright Delta empennage configuration with three control surfaces in respective thrust plumes of three upstream fluid thrusters, with a central thruster.

Figure 21:
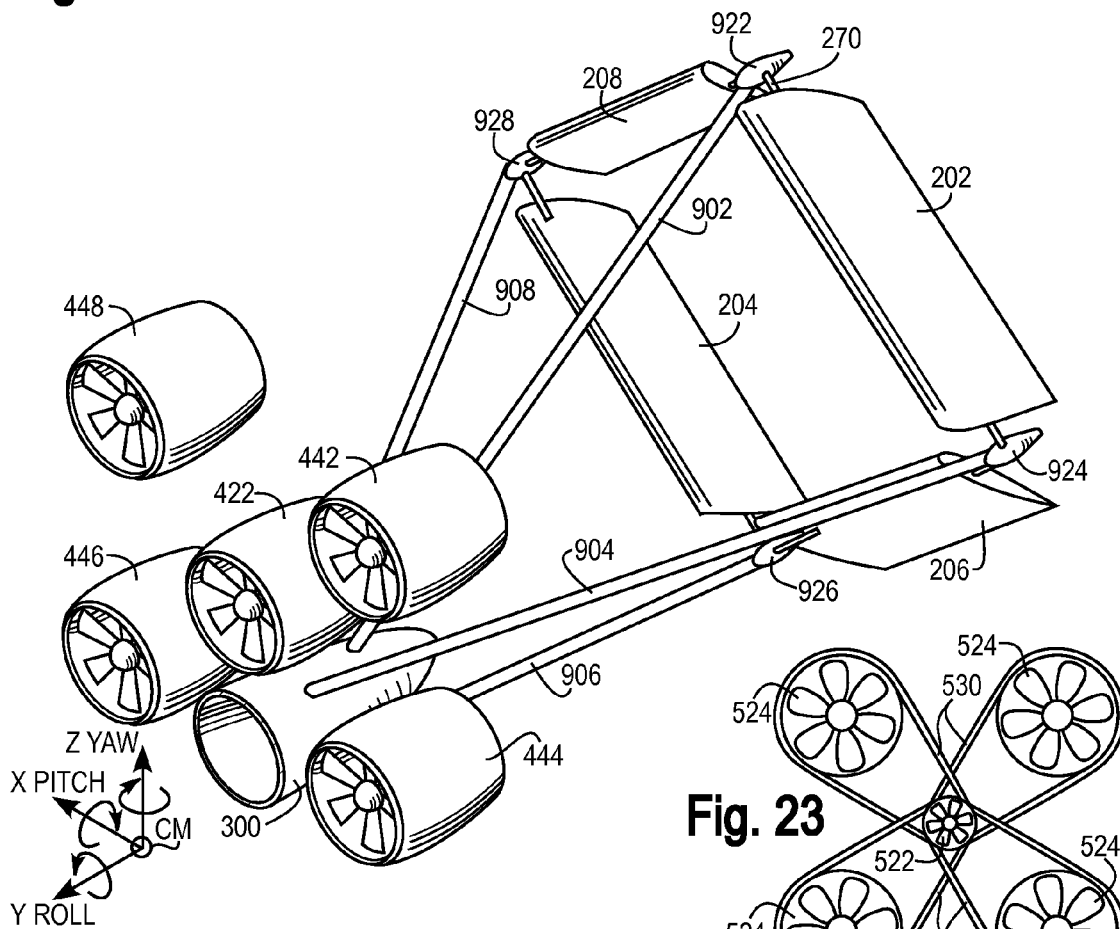

FIG. 21 shows a schematic perspective view of a diamond empennage configuration with four control surfaces in respective thrust plumes downstream of four fluid thrusters, with a central thruster.

Figure 22:
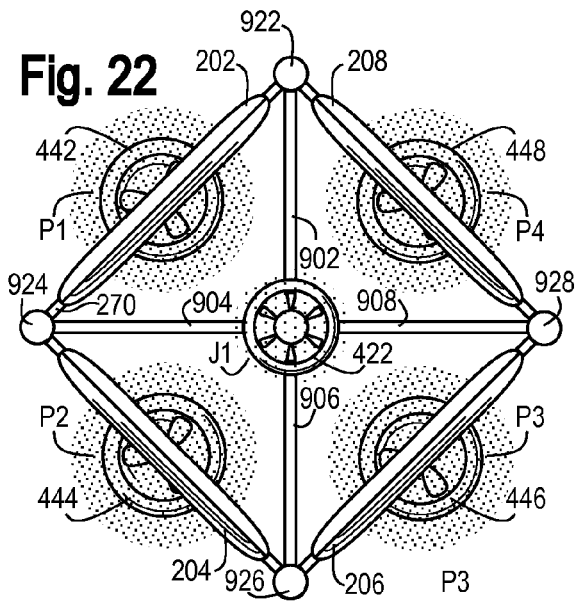

FIG. 22 shows a schematic tail elevation view of a diamond empennage configuration with four control surfaces in respective thrust plumes of four upstream fluid thrusters with a central thruster.

Figure 23:
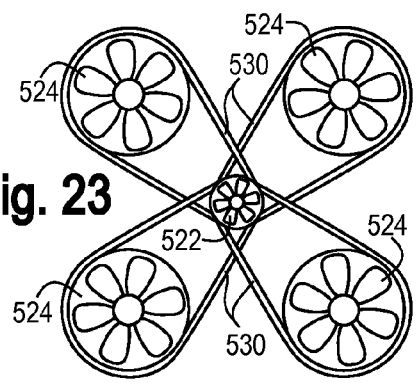

FIG. 23 shows a schematic elevation view of a belt system driving four fluid thrusters in a box configuration about a central prime mover.

Figure 24:
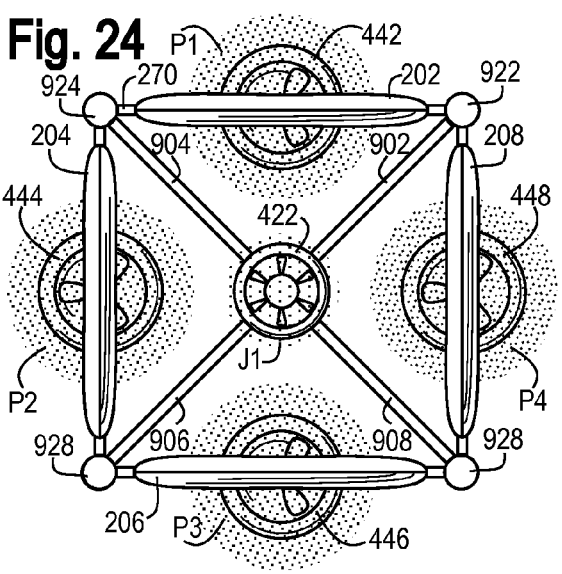

FIG. 24 shows a schematic tail elevation view of a box empennage configuration with four control surfaces in respective thrust plumes of four upstream fluid thrusters, with a central thruster.

Figure 25:
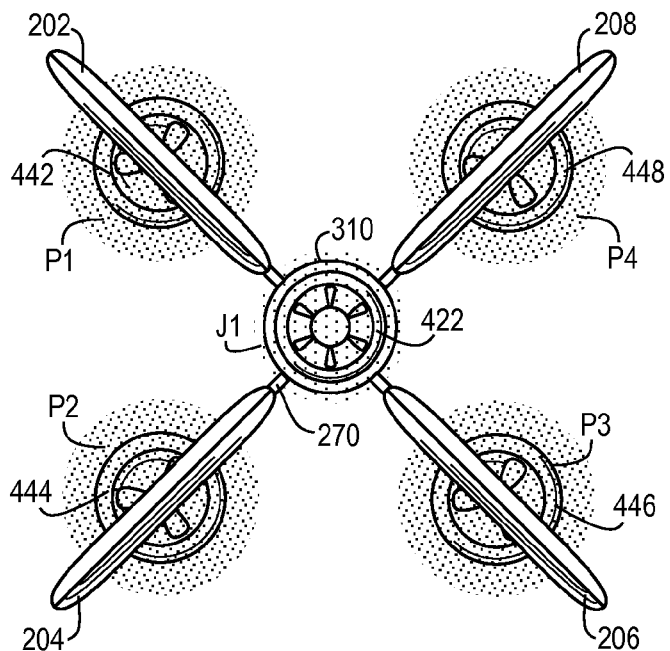

FIG. 25 shows a schematic tail elevation view of an X empennage configuration with four control surfaces in respective thrust plumes of four upstream fluid thrusters, with a central thruster.

Figure 26:
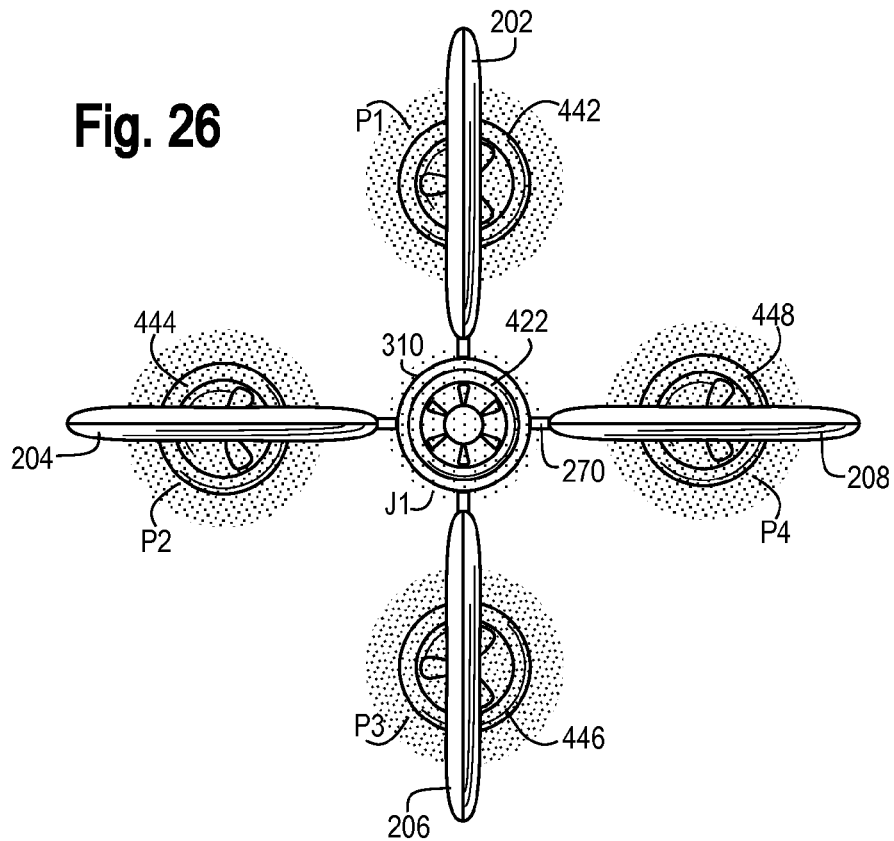

FIG. 26 shows a schematic tail elevation view of a cross empennage configuration with four control surfaces in respective thrust plumes of four upstream fluid thrusters, with a central thruster.

Figure 27:
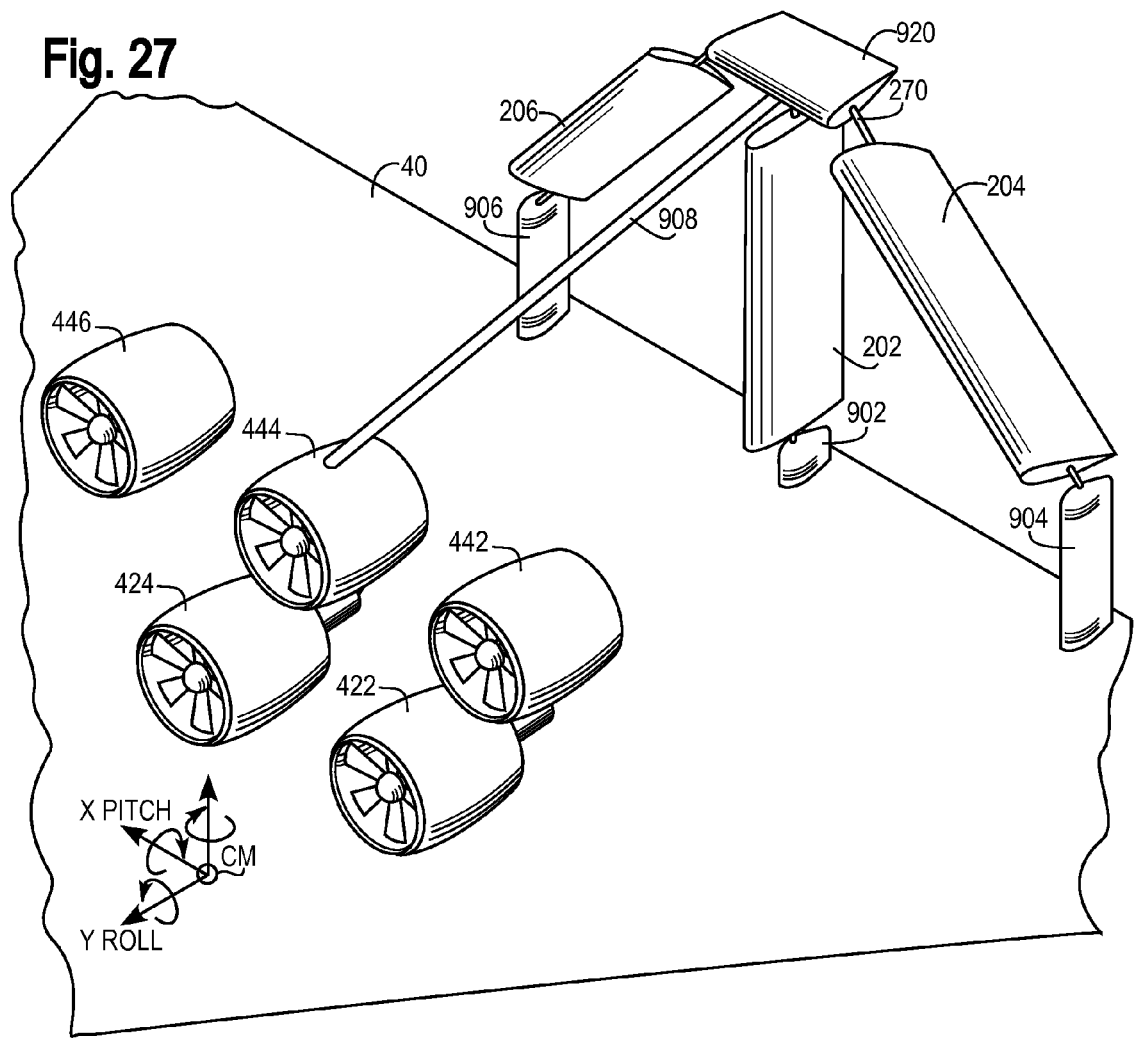

FIG. 27 shows a perspective view of an inverted trident empennage configuration with three control surfaces downstream of three fluid thrusters, with two lower thrusters.

Figure 28:
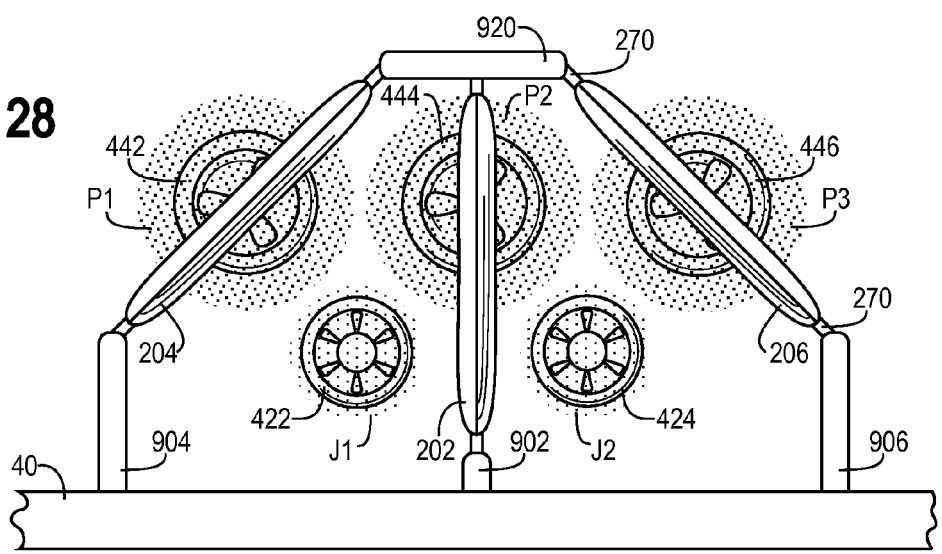

FIG. 28 shows a schematic tail elevation view of an inverted trident empennage configuration with three control surfaces in respective thrust plumes of three upstream fluid thrusters, with two lower thrusters.

Figure 29:
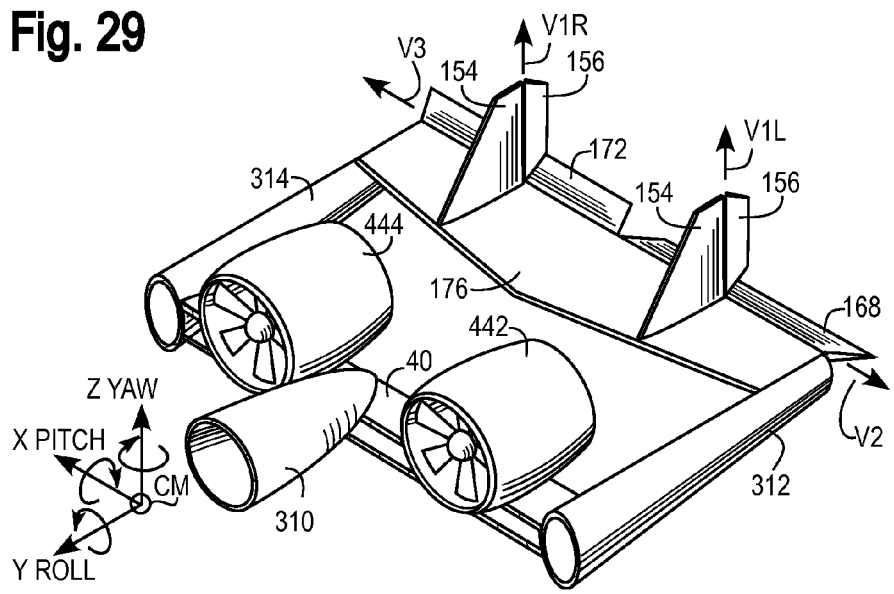
Figure 30:
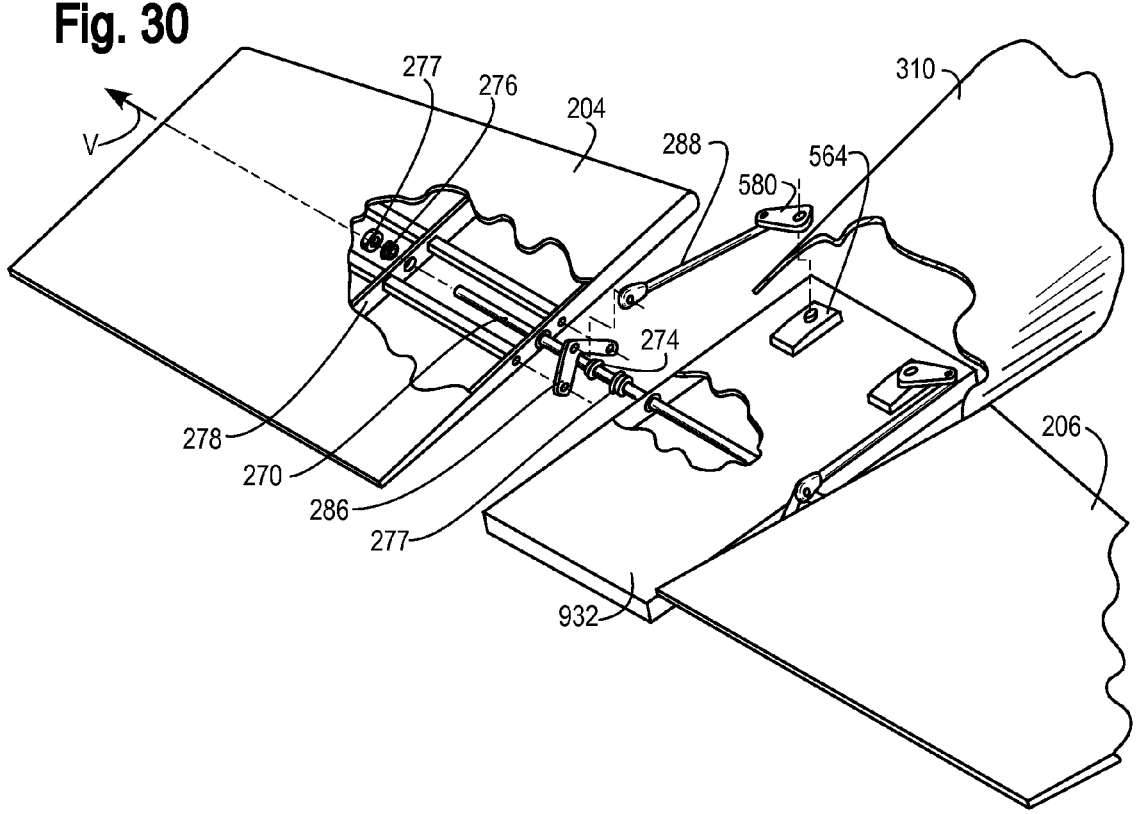

FIG. 29 shows a perspective view of an empennage with two roll-pitch elevators and two rudders mounted on a stabilizer between two tail booms downstream of dual thrusters FIG. 30 shows a perspective view of a crank linkage with rotary actuator for a stabilator.

FIG. 31 shows a schematic tail elevation view of two control surfaces on an empennage in an upright V configuration about a stabilizer in the thrust plume of an upstream propeller fluid thruster.

FIG. 32 shows a schematic tail elevation view of two control surfaces in an inverted V configuration with one horizontal control surface in empennage in the thrust plumes of two upstream propeller fluid thrusters.

FIG. 33 shows a schematic tail elevation view of an empennage with two control surfaces in an upright V configuration between the thrust plumes of two outer upstream fan thrusters and a central jet thruster, with two horizontal control surfaces.

FIG. 34 shows a schematic elevation view of a belt drive system driving two outer fluid thrusters about a central prime mover.

Nomenclature and Parameters

Orientation: An aircraft 1 described herein is typically oriented with an X or Pitch axis looking "right" through an aircraft reference location L, transverse to the direction of normal forward flight. The aircraft has a second Y or Roll axis through the reference location L, typically oriented "forward" along the direction of normal forward flight. A further Z or Yaw axis goes through the reference location L, normal or perpendicular to the plane through the X and Y axes, with the positive Z direction oriented upwardly using the right hand rule. The X, Y and Z axes are preferably located through the aircraft's center of mass CM. The directions left and right are usually taken in the X axis direction with respect to the Y Roll axis, as viewed by the pilot (left) and co-pilot (right) facing forward. The directions fore and aft are usually taken in the Y axis direction relative to the X axis and in the direction of normal forward flight as viewed by the pilot and co-pilot. Up and down are usually taken in the Z axis direction with respect to the XY Plane. Thus, the positive Z axis is above the aircraft's Center of Mass CM relative to the XY plane while the negative Z axis is below the aircraft's CM relative to the XY plane.

Kinematically: providing relative movement, such as pivoting about an axis, using a four-, five- or six-bar mechanism, using a hydraulic actuator with a linkage, or other kinematic mechanism to provide relative movement; herein also termed movably.

Control Surface Rotation or Motion Axis V or V': Each kinematically or movably coupled control surface generally pivots about an rotation axis V, or moves rotatably about an equivalent instantaneous rotation axis V' oriented or controlled by a kinematic mechanism.

Relative wind: The speed and direction of flowing air relative to an aircraft's attitude and certain direction of flight.

Center of Pressure C: Each kinematically coupled control surface has a center of pressure C formed from the combination of the thrust plume (and/or jet plume) in streamline flow from an upstream thruster, and the relative wind.

Thrust Plume: An accelerated fluid flow thrust stream, designated with the letter P, in streamline flow from an upstream fluid thruster.

Jet Plume: The generally hot accelerated fluid flow, designated with the letter J, in streamline flow from an upstream jet thruster.

Aerodynamic Force F: The thrust plume (and/or jet plume) and/or relative wind flowing over the kinematically coupled control surfaces create an equivalent vector force F through the center of pressure on each control surface.

Moment Arm R: Each kinematically coupled control surface has a moment arm R taken from the center of mass of the aircraft CM to the center of pressure C of the respective control surface.

Fluid Moments: The vector product of the Moment Arm R and the Aerodynamic Force F through a kinematically coupled control surface center of pressure forms a vector moment T about the aircraft's Center of Mass. The vector moment T may be resolved into respective vector moments about three primary axes X, Y, and Z. That is, T may be resolved into a Pitch moment Tp, a Roll moment Tr, and a Yaw moment Ty, respectively, about the X-Pitch, Y-Roll, and Z-Yaw axes.

Control Surface Orientation: The terms horizontal and vertical when used with respect to control surfaces refer to orientations generally in the aircraft's XY plane and the YZ plane respectively.

DETAILED DESCRIPTION OF PREFERRED EMBODIMENTS

Figure 1:
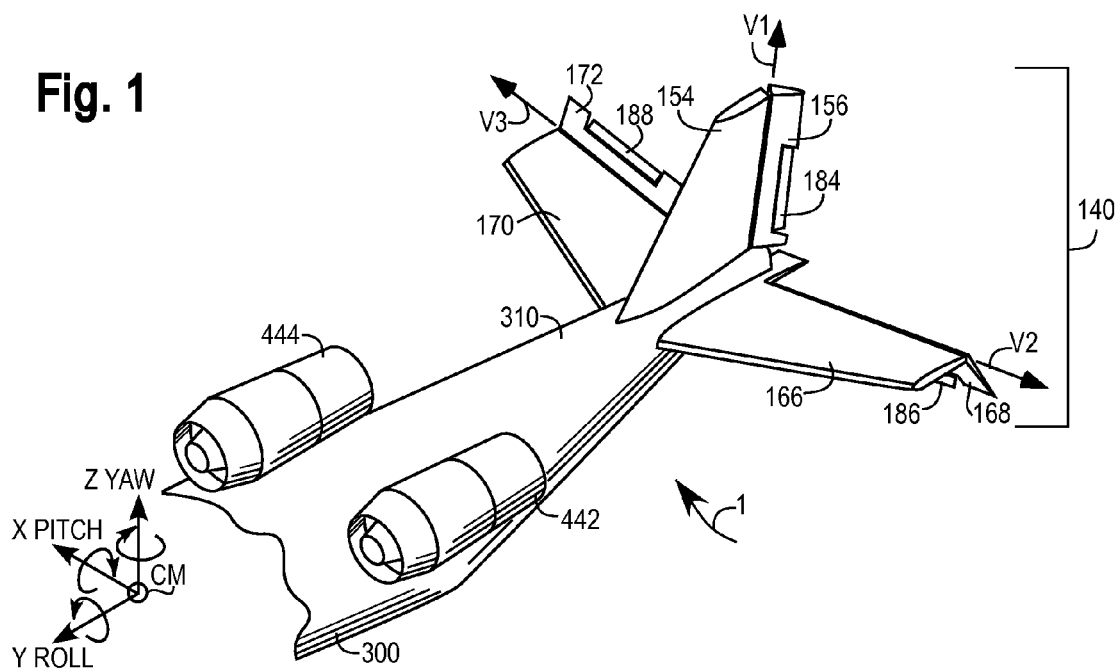
FIG. 1 shows a perspective view of an aircraft rear portion with an empennage having left, right and central differential control elevators with trim tabs respectively downstream of fluid thrusters oriented for clockwise roll, and the X Pitch, Y Roll and Z Yaw axes reference system.

With reference to FIG. 1, one embodiment of the invention comprises an airplane or aircraft 1 with a fuselage 300 having a tail boom 310 to which is mounted an empennage or tail assembly 140. The empennage 140 preferably comprises multiple kinematically coupled control surfaces mounted in the fluid flow thrust stream or thrust plume in the streamline flow downstream from at least one upstream fluid thruster 442 mounted on the aircraft. The propulsive fluid thruster 442 is typically driven by an internal combustion or jet prime mover. A left roll-pitch elevator 168 is preferably kinematically (pivotably or otherwise movably) coupled on a left horizontal stabilizer 166 mounted to the tail boom 310. A right roll-pitch elevator 172 is preferably kinematically mounted on a right horizontal stabilizer 170 attached to the tail boom 310, such as with pivoting supports. These elevators 168 and 172 are typically complemented by a Yaw control surface or rudder 156 kinematically coupled on a yaw vertical stabilizer 154, which is mounted on the tail boom 310. One or more orientable or controllable trim tabs 184, 186 and/or 188 are preferably kinematically coupled to the rudder 156 and/or elevators 168 and 172. The trim tabs are operable to different planes from the respective control surfaces, preferably with smaller deviations from the roll axis.

Preferably, a plurality of fluid thrusters is mounted on the aircraft to accelerate air and provide a generally forward thrust to the aircraft for forward flight or acceleration. This beneficially increases the cross sectional area of thrusters and thrust plumes relative to aircraft mass, thereby reducing velocity of the thrust plume relative to the plane, and increasing the thrust efficiency. For example, the first or left thruster 442, and a second or right thruster 444 are preferably mounted so they are aligned to be about parallel to the Y or Roll axis. They are preferably displaced symmetrically to the left and right of that Y-Roll axis. At least some thrusters and related stabilizing control surfaces, such as elevators 168, 172 and rudder 156, are preferably positioned about upstream/downstream with respect to each other so as to provide thrust and orientation control for normal flight under cruise conditions. For example, the left thruster 442 and left stabilizer 166 are preferably positioned fore/aft with respect to one another as are the right thruster 444 and right stabilizer 170. The vertical position of the thrusters is preferably configured to compensate for the aircraft's drag versus lift moment about the X-Pitch axis in level flight, including the typical empennage drag.

With further reference to FIG. 1, at least two fluid diverting kinematically coupled control surfaces are provided on the empennage 140. For example, a first or "left" control surface or "left" elevator 168, and a second or "right" control surface or "right" elevator 172 may be pivotably mounted with respect to the tail boom 310. These control surfaces 168 and 172 may be mounted to pivot about two vector axes, V2 and V3. The control surfaces are preferably configured to be movable about equivalent instantaneous vectors V2' and V3'. For example, control surfaces may be positioned and operated by four, five or six bar mechanisms relative to the tail boom 310. Movement systems may include fluid actuators and linkages similar to moveable couplings operating aircraft flaps. For example, the left elevator 168 may be kinematically (pivoted on or otherwise movably) supported by the left stabilizer 166 mounted on the empennage 140. The right elevator 172 may be kinematically supported by a "right" stabilizer 170.

The at least two left and right control surfaces are movable (or orientable) and operable (or controllable). Preferably these two control surfaces may be moved in different directions (or oriented in the same sense by the right hand rule) relative to one another and vice versa. That is, the right control surface 172 may be moved "upwardly" (oriented counter-clockwise) while the left control surface 168 is moved "downwardly" (oriented counter-clockwise) and vice versa. More preferably, the control surfaces may be moved independently of one another. That is, one control surface may be moved without or with any corresponding movement in the other control surface. Similarly, the two control surfaces may be moved by different magnitudes in the same direction (or oriented to different degrees in the opposite sense).

With further reference to FIG. 1, the control surfaces 168 and 172 may be positioned along or near a trailing edge of horizontal stabilizers so they can be pivoted about surface movement axes V2 and V3. The control surfaces 168 and 172 may be kinematically coupled or mounted with equivalent surface movement axes VT and V3' (not shown), which are configured near the respective centers of pressure C2 and C3 (not shown) on the respective control surfaces, and preferably through the respective centers of pressure (Compare FIG. 2.) This configuration beneficially reduces or minimizes the torque needed to operate these control surfaces.

With reference to FIG. 1, a fluid thruster 442 is positioned upstream of the two control surfaces or elevators 168, 172 so the thrust plume of the fluid thruster 442 is directed to pass near and/or impinge on the two control surfaces sufficient to create forces F1 and F2 on the two control surfaces. In another embodiment, the left and right elevators 168 and 172 are more preferably configured downstream in or near the respective thrust plumes of two fluid thrusters 442 and 444. These thrusters may be configured as a first or left thruster 442, and a second or right fluid thruster 444, both of which may be mounted on the fuselage 300 or tail boom 310 of the aircraft. The thrusters 442 and 444 may also be mounted on one or more wings (not shown) attached to the fuselage 300 upstream of the airplane's rear section or empennage 140.

With reference to FIG. 1, roll control is preferably achieved by moving the two elevators 168 and 172 in opposite directions. To give a clockwise roll moment or angular acceleration, left elevator 168 may be moved downwardly (or in a counter-clockwise direction with respect to the Y-Roll axis looking forward) relative to a horizontal aircraft configuration. Correspondingly, right elevator 172 may be moved upwardly (or in a counterclockwise direction with respect to the Y Roll axis). Together these actions apply a net clockwise roll moment to the aircraft generally about the Y-Roll axis. Similarly, to provide a net counter-clockwise roll moment, the first or control surface 168 may be moved upwardly (clockwise) into the thrust plume from left thruster 442 to direct the left horizontal stabilizer downwardly and the right control surface 172 may be moved downwardly (clockwise) in the thrust plume from right thruster 444 to direct the right horizontal stabilizer upwardly. One or both of these control surface orientations apply a counter-clockwise roll moment or roll component to the aircraft 1.

The thrust plumes from the thrusters generate vector forces on the control surfaces to provide fluid thrust moments relative to the aircraft's center of mass. Thus, the thrusters and the differentially controlled elevators enable Short/Vertical Take Off and Landing (S/VTOL) aircraft to retain some degree of control during hover or slow movement when conventional elevators may have little effect because the relative airflow over them is so small. They are also beneficial for other aircraft by increasing the available control moments or their magnitude, especially near stall speed.

With further reference to FIG. 1, a third fluid directing control surface 156 may be kinematically coupled to the empennage 140 relative to the tail boom 310. For example, a vertical oriented rudder 156 may be pivotably or otherwise movably mounted on a vertical Yaw stabilizer or tail 154 which is supported by the tail boom 310. The rudder 156 may also be configured near to or preferably within and downstream of the thrust plume from at least one upstream thruster 442.

With reference to FIG. 9, the left control surface (or left elevator) 168 and right control surface (or right elevator) 172 may be kinematically coupled to a stabilizer 176 supported on the aircraft's rear section. For example, the control surfaces may be mounted between a left tail boom 312 and a right tail boom 314, both of which may be mounted on a wing 40 supported from the tail boom 310 (or fuselage 300). The control surfaces (or elevators) 168 and 172 are preferably mounted at least partially within the thrust plume of an upstream thruster 440, which is mounted in or on the tail boom 310 (or fuselage 300). A central vertical yaw control surface or rudder 156 may be kinematically mounted relative to the tail booms 312 and 314. That is, the rudder 156 may be movably coupled to a vertical stabilizer 154 which is attached to the horizontal stabilizer 176.

The two control surfaces (or elevators) 168 and 172 are preferably differentially operable to provide roll control. They are more preferably, fully and independently operable (or controllable) about their respective movement axes V2 and V3 to provide roll and/or pitch control. In FIG. 9, the left control surface (elevator) 168 is shown in an up position (clockwise about the −Y-Roll axis) and the right control surface (elevator) 172 is shown in a down position (counter-clockwise about the Y-Roll axis). These control surfaces individually, and preferably, collectively, provide a net clockwise moment about the Y-Roll axis as described above.

With reference to FIG. 29, a similar configuration may use a plurality of control surfaces 156 mounted on vertical stabilizers 154 within the thrust plumes of one or more upstream thrusters 442, 444, which are mounted on one or more fuselages 300, tail booms 310, and/or wings 40. For example, the left thruster 442 and the right thruster 444 may be mounted on the transverse strut or wing 40, which supports two tail booms 312 and 314. The tail booms 312 and 314 preferably support the horizontal stabilizer 176 to which the left control surface 168 and right control surface 172 are kinematically coupled. Multiple vertical yaw control surfaces or rudders 156 may be kinematically supported between the two tail booms 312 and 314 to rotate or move about vectors V1L and V1R. One or more additional stationary vertical stabilizers 154 may be provided such as at the ends of the horizontal stabilizer 176 and/or tail booms 312 and 314. Other rudders and vertical stabilizers may be similarly applied to empennage configurations having three or more tail booms.

Figure 2:
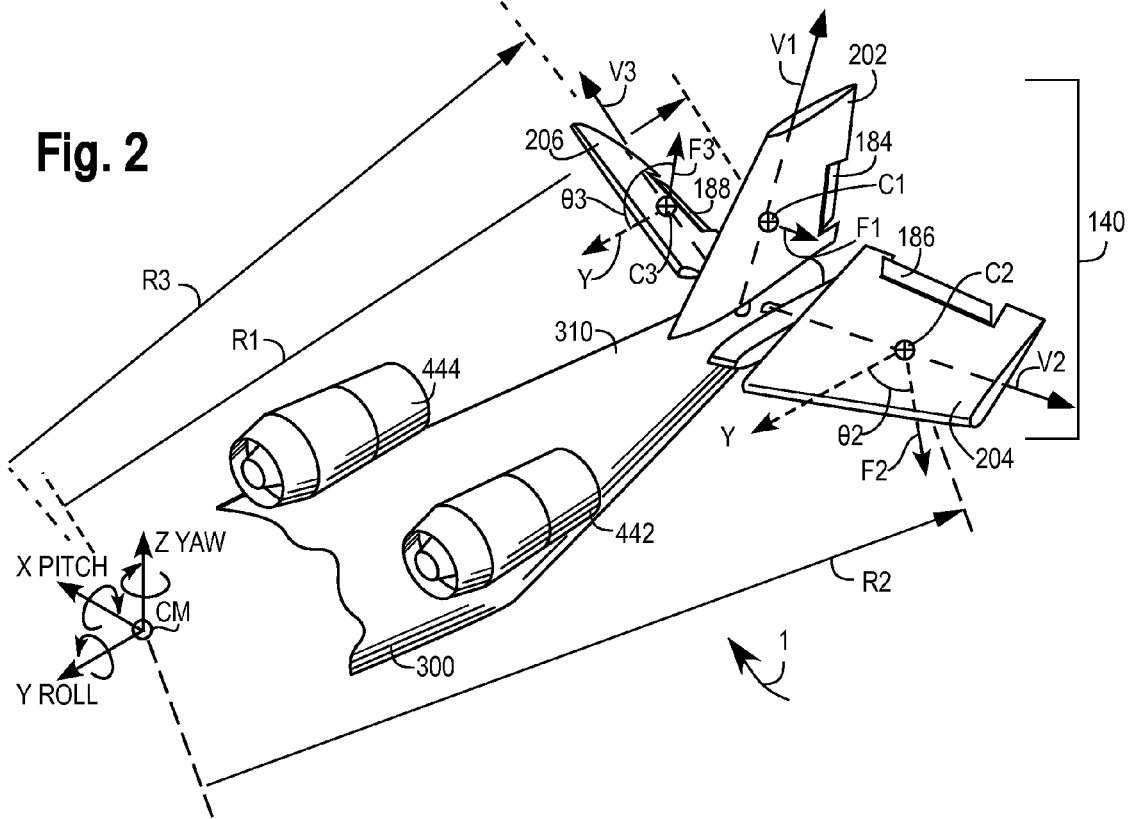
FIG. 2 shows a perspective view of an aircraft rear portion with an empennage having left, right and central differential control stabilators with trim tabs downstream of fluid thrusters oriented for counter clockwise roll.

With reference to FIG. 1 and FIG. 2, at least one, preferably two, and more preferably, all three of the stationary stabilizers 154, 166, and 170, and associated movable left and right control surfaces (elevators) 168, 172, and the yaw control surface (rudder) 156 of empennage 140, are replaced by at least one, preferably two, and more preferably, three kinematically or movably coupled stabilators. These stabilators may be pivotably mounted, and are preferably otherwise movably mounted with respect to the aircraft. For example, in one configuration, the empennage comprises a central vertical or yaw stabilator 202, a left roll-pitch stabilator 204, and a right roll-pitch stabilator 206, all of which are kinematically coupled to the tail boom 310. The roll-pitch stabilators 204 and 206 are preferably at least differentially orientable (or controllable) to provide opposite rotations about their axes of rotation V2 and V3, respectively (or instantaneous axes of movement VT and V3' not shown). One or more trim tabs 184, 186 and/or 188 may be kinematically coupled to one or more stabilators 202, 204 and/or 206.

Referring to FIG. 2 (and similarly to FIG. 1) at least two control surfaces 204 and 206 (and similarly 168 and 172) are typically operable to give vector forces F2 and F3 through respective Centers of Pressure C2 and C3. The vector forces F2 and F3 have angles Theta2 and Theta2 Vector forces F2 and F3 with respect to the Y-Roll axis. Each control surface 204 and 206 (similarly 168 and 172) is preferably operable to provide a clockwise roll moment component. For example, forces F2 and F3 have components with moment arms with the same sense about the Y-Roll axis when projected onto the XZ plane. These can generally be configured when the forces F2 and F3 are not co-linear with the Y-Roll axis or Theta2 and Theta3 are not 0 deg or 180 deg. Control surfaces may be configured with similar deviations in a similar sense relative to the Y-Roll axis while providing a net roll moment.

The control surfaces 204 and 206 of FIG. 2 (and similarly 168 and 172 in FIG. 1) are preferably configurable to give force angle deviations Delta of greater than about plus or minus one degree (+/−1° from the neutral orientations (which are about plus or minus ninety degrees). The control surfaces are preferably configurable to give force angle deviations (deviations in force angles Theta1 and Theta2 from neutral) of more than plus or minus about ten degrees (+/−) 10°, and more preferably more than plus or minus about forty five degrees (+/−45°. In some configurations, the control surfaces are preferably actuated to force angle deviations greater than plus or minus about sixty degrees (+/−60° and, more preferably, the control surfaces may be moved to force angle deviations of greater than about ninety degrees (+/−90°. For example, when a braking effect is desired, the control surfaces may be operated to higher control angles Theta to provide correspondingly increased drag.

At least one of the control surfaces, or their actuating mechanisms, are preferably configured with movement encoders such as rotary encoders or displacement encoders. The precision of operating the control surfaces may be within plus or minus about one degree (+/−1°, using for example, seven bit encoder resolution for a 120 degree range, and preferably, within about plus or minus about four tenths of a degree (+/−0.4° using, for example, 10 bit encoder resolution for a 360 degree range. More preferably, the operation control surface operating precision is within about plus or minus about nine hundredths of a degree (+/−0.09° using, for example, 12 bit encoder resolution for a 360 degree range, and more preferably still, within plus or minus six thousands of a degree (+/−0.006° using, for example, 16 bit encoder resolution for a 360 degree range. One or more trim tabs 184, 186 and/or 188 may similarly be configured and provided with encoders. Such configurations provide improved control resolution and precision.

The vector forces F2 and F3 acting through the respective right and left control surface centers of pressure C2 and C3, have a mutual differrence angle. For example, when these vector forces on horizontal stabilizers are projected onto the YZ plane they exhibit a mutually projected difference angle corresponding to the difference between Theta1 and Theta2. These control surfaces may be moved so vector forces are non-aligned with the mutual angle Delta greater than about plus or minus one degree)(+/−1°, or their absolute mutual angle is greater than about one degree.

Figure 3:
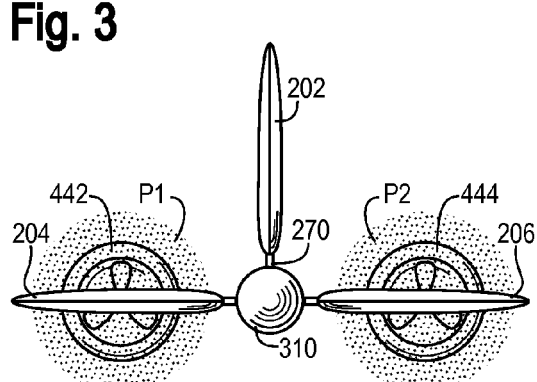
FIG. 3 shows a schematic tail elevation view of an inverted T empennage with left and right differential roll-pitch control surfaces in respective thrust plumes downstream of left and right fluid thrusters, and a Yaw control surface.

The empennage configuration of FIG. 2 (and/or similarly FIG. 1) is schematically shown in FIG. 3 in elevation from the tail end looking forward. That is, a left control surface 204 and a right control surface 206 are kinematically coupled or mounted about tail boom 310 in an inverted T configuration. The left control surface 204 and right control surface 206 are preferably configured within the first (left) thrust plume P1 and second (right) thrust plume P2, respectively, of accelerated fluid flows that flow downstream from the left thruster 442 and right thruster 444, respectively (schematically shown as speckled cross sections P1 and P2, respectively.)

Referring to FIG. 2, the movable control surfaces may pivot or move rotatably about their support shafts or pivot axes V. As shown in the figure, stabilators 202, 204, and 206 may be controlled to move about axes V1, V2 and V3 respectively. The movable control surfaces are preferably operable by four, five or six bar mechanisms or other mechanisms suitable to provide desired control surface movement about equivalent instantaneous movement axes V1', V2' and V3' (not shown). For example, as shown in FIG. 10, a stabilator 200 may be attached to or mounted on a stabilator shaft 270 by one or more suitable attachments 940. The shaft 270 may be mounted between an upper bearing 274 and a lower bearing 278. One of the bearings may provide a thrust constraint to hold the stabilator shaft 270 in position relative to a tail boom 310 or similar support. Similarly, a clamping collar may be used. The stabilator shaft 270 is preferably rotatable within the bearings 274 and 278. The rotational orientation of the shaft 270 and, correspondingly, the stabilator attached to it, may be controlled by a stabilizer actuator arm 286 mounted on the stabilizer shaft 270 and pivotably connected to the shaft of an actuator 562. The actuator 562 is movably mounted on an actuator support 932, which is attached to the wall of the tail boom 310, a spar, or similar support on the aircraft. The actuator 562 is preferably an axial actuator. This activator may be a fluid actuator, such as a hydraulic or pneumatic fluid actuator. Similarly, an electromagnetic actuator may be used, such as a proportional solenoid or linear stepper motor. The stabilator's rotational orientation is preferably measured by a rotary encoder 771 mounted on the stabilator shaft 270 and on an encoder support 934. Similarly, the extension of the actuator 562 may be measured between actuator arm 286 and pivotable support 932.

With reference to FIG. 30, the stabilator 204 and/or 206 may be driven by a rotary actuator 564 about its movement axis V. This configuration may use one or more stabilizer actuator linkages and related transmission components, such as are well known in the art. For example, in FIG. 30, the stabilizer actuator may use an electromagnetic rotor, a stepper motor, or servo motor to rotatably actuate the stabilizer 204 or 206, by rotating directly connected stabilator shaft 270, or by moving a drive system comprising linkages, cables and/or pulleys. The rotary actuator 564 drives a linkage 580 which is linked to move a stabilator linkage 288 to rotate an actuator arm 286 to rotate the attached stabilator 204 about the stabilator shaft 270 mounted on support 932 connected to tail boom 310. The stabilator 204 may be supported by ribs 278 on bearings or bushings 274 and 276 about stabilator arm 270. The stabilator 204 is held on the stabilator arm 270 by a clamping collar 277 or equivalent method such as using thrust bearings 276. Similarly, the stabilator 204 may be rigidly connected to stabilator arm 270 which is movably mounted on thrust bearings 274 to support 932 to the tail boom 310. In a similar configuration, the stabilator arm 270 may rotate freely of both stabilator 204 and support 932 and the stabilator 204 held in place by clamping collars 277 and/or thrust bearings 276. The stabilators may similarly be driven by mechanical linkages comprising cables and bell cranks. One or more control surfaces may be actuated directly by a pilot using suitable kinematic mechanisms and transmissions instead of by using mechanical, pneumatic, or electromagnetic actuators. Similarly, one or more controllers may be used to provide actuating signals to one or more actuators, whether in an autopilot configuration, and/or receiving orientation and/or flight signals by remote control, and/or in configurations or situations where such signals are provided directly by hands-on pilot/co-pilots.

With reference to FIG. 9, elevators 168 and 172, and/or the rudder 156 are provided with suitable actuators, such as those described with reference to FIG. 10 and FIG. 30. The stabilators 202, 204, and 206 may be independently orientable and operable (or controllable) about their axes of movement or rotation V1, V2, and V3, respectively. This independent motion enables the stabilators to be oriented to provide combinations of one or more of roll, pitch and/or yaw control moments. Additionally, the stabilators or actuating mechanisms are preferably configured with movement encoders such as rotary encoders or displacement encoders. These encoders enable the precision of control for the stabilators to be within the range of control described above for the elevators 168, 172.

At least one and preferably at least two or more stabilators may be mounted downstream of one or more thrusters or propulsive rotors or thrusters as discussed above with reference to FIG. 3. In this configuration, the stabilators may provide reactive pressure differential force, and/or provide active deflection of the propulsive air flow or thrust plume from the thrusters. Consequently, the stabilators may be oriented to provide greater control moments relative to conventional configurations, particularly in hover or slow motion, or in low relative wind situations.

Figure 4:
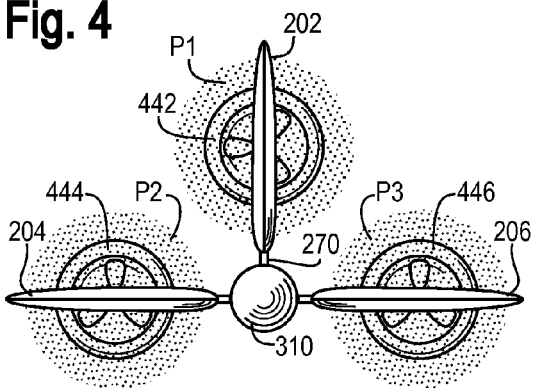
FIG. 4 shows a schematic tail elevation view of an inverted T empennage with a Yaw and two left and right differential Roll-pitch control surfaces in respective thrust plumes downstream of three fluid thrusters.

With reference to FIG. 4, at least three control surfaces are configured near or in the thrust plumes P or jet plumes J of at least one and, preferably, a plurality of fluid thruster flows. At least two of these control surfaces are preferably differentially operable (or controllable) to provide a roll control moment capability. More preferably, each of the control surfaces is independently orientable or controllable about its axis of rotation. As shown in FIG. 4, the three control surfaces may be arranged in an inverted T configuration. For example, the left stabilator 204 may be configured in left plume P2 downstream of left thruster 444, right stabilator 206 may be configured in right plume P3 downstream of right thruster 446, and the central fluid control surface or rudder stabilator 202 may be positioned in the plume P1 downstream of the corresponding central or upper fluid thruster 442.

Referring to FIG. 2, the relative wind and thrusted fluid or plumes from upstream thrusters or jets flowing over the control surfaces generate a vector force F through the center of pressure C on each control surface. Each movable control surface also has a corresponding vector moment arm R taken from the aircraft's center of mass CM to the center of pressure C of that control surface. For example, vector moment arms R1, R2, and R3 extend from the Center of Mass CM to the center of pressure C1, C2, and C3 on stabilators 202, 204, and 206. (The moment arms R1, R2, and R3 are shown displaced from CM and C1, C2, and C3 for clarity.) The vector forces F arising from the thrust and/or jet plumes plus the relative wind moving across and/or diverted by the control surfaces or stabilators generate vector moments T about the aircraft's Center of Mass CM through the vector moment arms R. These vector moments may be resolved into respective vector moment components about three primary axes. For example, vector moment components Tp, Tr, and Ty (not shown) are formed respectively about the X-Pitch, Y-Roll and Z-Yaw axes for each of the stabilators. These vector moment components may then be summed to give equivalent composite moments Tp, Tr, and Ty.

Changes in air velocity or air momentum exert cause aerodynamic force(s) F and moment(s) T on an aircraft whenever one or more of the thrusters 442 and 444 are working and the respective downstream stabilator is oriented or controlled away from the neutral position. In these embodiments, the air flows from the thrusters form vector forces Fi on the control surfaces and vector moments Ti on the aircraft, even when the aircraft is stationary, in slow motion, or in a low relative wind configuration. These vector moments may be used to orient the aircraft and/or control its motion during hover or slow speed maneuvering, as well as in rapid flight. For example, as shown in FIG. 2 and FIG. 4, each of the stabilators 202, 204, 206 are oriented to position the respective centers of pressure C1, C2, and C3, off of the Y-Roll axis to provide the respective roll moment components Tr1, Tr2, and Tr3 about the Y-Roll axis. Each stabilator may be configured to be independently orientable and operable (or controllable). In the inverted T configuration shown in these figures, the two stabilators are movably coupled and configured to be approximately coplanar in the neutral orientation. Here, the left and right stabilators 204 and 206 located on opposite sides of the tail boom 310 and being independently operable (or controllable) about rotation vectors V2 and V3. Such configurations beneficially provide enhanced fluid momentum diversion for one or more and, preferably, each of the fluid control surfaces 202, 204, and 206. Here, each of the control surfaces is preferably orientable or operable to impart one or more of a pitch moment Tp, a roll moment Tr, and a yaw moment Ty to the aircraft. One or more stabilators are preferably positioned aft or downstream of the center of mass CM to provide naturally stable configurations. However, stabilators may be positioned upstream of the center of mass in some configurations.

By positioning the rudder downstream of a fluid thruster, as shown in FIG. 4, a yaw moment Ty is provided when the rudder is displaced from the Z-Yaw axis. The Y-Roll axis may pass through the center of pressure of the stabilator 202 (or equivalently elevator 156) to provide a pure yaw moment. However, the rudder's center of pressure may be off the Y-Roll axis to provide a yaw moment with some roll moment about the Y-Roll axis. In such configurations, the at least three control surfaces, stabilators 202, 204, and 206 (or equivalently, elevators 168, 172, and rudder 156), are, preferably, jointly operable to provide a prescribed composite roll moment to the aircraft generally about the Y Roll axis.

In embodiments such as shown in FIG. 2 and FIG. 12, at least two and, preferably, three or more stabilators are configured to be non-coplanar. For example, three stabilators 202, 204, and 206 may be configured so their rotation axis vectors V1, V2, and V3 are not co-linear and the stabilators are not co-planar in their neutral orientations. Such configurations provide three different non co-linear moment arms R1, R2, and R3 from the center of Mass CM to the center of pressures C1, C2, and C3 of the respective stabilators. Such configurations provide the benefit of at least two and, preferably, three net control moments about the center of mass. Such control surface configurations may enable aircraft to be controlled without ailerons as they are used in conventional aircraft. Accordingly, complexity and costs may be reduced.

Figure 5:
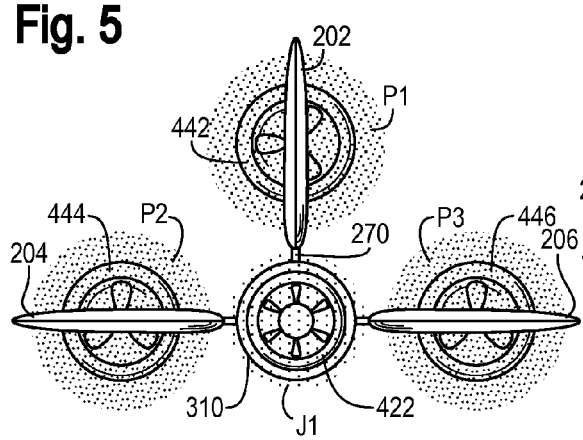
FIG. 5 shows a schematic tail elevation view of an inverted T empennage with a Yaw and two left and right differential roll-pitch control surfaces in respective thrust plumes downstream of three fluid thrusters, and with a central thruster.

With reference to FIG. 5, the configuration of FIG. 4 may be modified to incorporate a thruster 422, such as a turbojet within the tail boom 310. Three fluid thrusters 442, 444, and 446 may be driven by a single prime mover 422, such as a turbojet, and/or by more than one prime mover (not shown). An additional propeller and/or fan may be mounted on the prime mover or jet 422 to form a turboprop and/or turbofan to further increase the air flow and thrust efficiency.

Stabilators 202, 204, and 206, as shown in FIG. 5, are preferably provided and pivoted on stabilator shafts 270 and/or movably mounted on the tail boom 310 in the thrust plumes P1, P2, and P3, respectively. These stabilators are located downstream of their respective fluid thrusters 442, 444, and 446 (as noted in the discussion of FIG. 4). The central thruster 422 may comprise a jet prime mover preferably configured with a thruster propeller and/or fan to form a turboprop and/or turbofan. Other prime movers, such as reciprocating or rotating internal combustion engines or pulse detonation engines, may be used. These thrusters 442, 444, and 446 direct a major portion of relatively cool accelerated air flow over the stabilators in contrast to the relatively high temperature of the jet thrust plume J1. The central thruster 422 and/or a second prime mover 424 preferably drive one or more additional thrusters (not shown) to further increase the system efficiency and reliability. The left and right stabilators 204 and 206 are preferably differentially operable to provide at least differential roll-pitch control. The central stabilator 202 may conveniently provide yaw control. More preferably, each of the stabilators 202, 204, and 206 is independently orientable and operable. They are preferably collectively controllable to selectively provide a wide range of pitch, roll, and yaw control moments and combinations thereof.

The configuration of FIG. 5 beneficially enables use of conventional construction materials for the stabilators giving substantially long life and modest costs. By contrast, constructing such stabilators from high temperature materials with protective coatings capable of withstanding a direct hot jet plume J1 reduces the operating life and/or significantly increases the costs of the stabilators. The fluid thrusters 442, 444, and 446 are preferably configured to provide thrust plumes P1, P2, and P3 with temperatures of less than about 650 degrees Celsius. The distance between the thrusters and the stabilators is preferably configured to maintain the temperature of the stabilators to below common structural material temperatures. For example, the stabilators are preferably located at a distance to maintain a temperature below about 293 degrees Celsius (about 500 degrees F.) or some similarly prescribed temperature corresponding to the structural materials chosen.

Thrust varies about at the two thirds power of the diameter of a ducted fan, propeller, or rotor. Configurations preferably provide a plurality of ducted thrusters to beneficially increase the thrust per cumulative duct area and to lower specific costs with small mass produced ducts, relative to a single larger duct and fan. Multiple propellers, and/or fans may be used. The increased air flow from greater duct area reduces the relative air velocity and increases the efficiency of the central prime mover 422 compared to conventional practice in high bypass turbofans. The prime mover may comprise an internal combustion engine, jet, turbojet, turbofan, and/or turboprop. Such configurations with multiple thrusters further enable greater bypass propeller and/or fan area compared to the limitations mandated by ground clearance in the use of a single large bypass fan or propeller.

Figure 6:
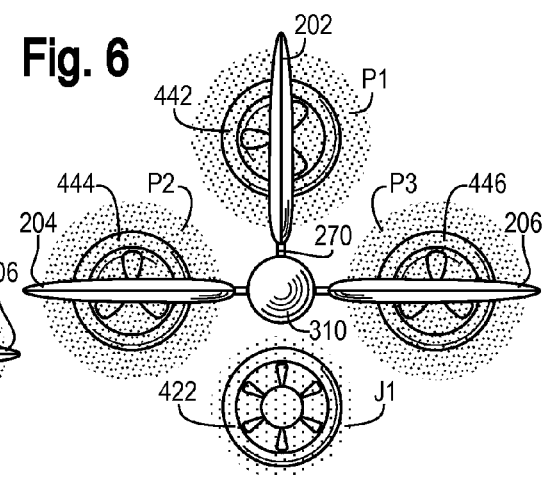
FIG. 6 shows a schematic tail elevation view of an inverted T empennage with a Yaw and two left and right differential roll-pitch control surfaces in respective thrust plumes downstream of three fluid thrusters, and with a lower thruster.

With reference to FIG. 6, the configuration of FIG. 5 is preferably modified to move the central prime mover 422 out of the tail boom 310 and mount it on the aircraft similar to the thrusters 442, 444, and 446. Here, the hot jet thrust plume J1 is preferably directed aft near and below the tail boom 310. This configuration may help increase the entrained air flow near the lower stabilators 204 and 206, improving their performance. In the empennage of FIG. 6, stabilators 202, 204, and 206 are preferably configured on stabilator shafts 270, which are movably mounted about a tail boom 310 (as in the configurations of FIG. 4 and FIG. 5.) These stabilators are preferably mounted in the thrust plumes P1, P2, and P3 of upstream thrusters 442, 444, and 446.

Referring to FIG. 7, stabilators 202, 204, and 206 of FIG. 2 and/or FIG. 3 (or elevators 168 and 172 and rudder 156 of FIG. 1) may be readily formed into an upright T configuration. This configuration is a rotation of the traditional inverted T configuration about the Y-Roll axis. FIG. 7 shows the stabilators 202, 204, and 206 being mounted on stabilator shafts 270, which are movably mounted about a tail boom 310 (similar to configurations of FIG. 4, FIG. 5, and FIG. 6). These stabilators are preferably mounted in the thrust plumes P1, P2, and P3 of upstream thrusters 442, 444, and 446.

In a similar fashion, the three thruster and three stabilator configurations (such as those shown in FIG. 4, FIG. 5, FIG. 6 and/or FIG. 7) may be configured with the stabilators at other angles. For example, the stabilator 202 may be oriented to the right (90 degrees from the Z-axis), to the left (270 degrees from the Z-axis), or at some other angle intermediate from the primary directions, to form right, left, and angled T configurations. In such configurations, the stabilators 204 and 206 may be correspondingly configured in right, left, and angled T configurations rotated at corresponding angles to stabilator 202.

Referring to FIG. 8, the stabilators 202, 204, and 206, and thrusters 442, 444, and 446 (such as the configurations shown in FIG. 6 and FIG. 7) may be configured with two lower prime mover thrusters 422 and 424. Here, the single jet thruster 422 of FIG. 6 is increased to two jet thrusters 422 and 424, which are positioned on either side of the aircraft relative to the central stabilator 202 of FIG. 7, and below the respective left and right stabilators 204 and 206. Prime movers 422 and 424 are preferably mounted upstream similar to thrusters 442, 444, and 446. Stabilators 204 and 206 are preferentially configured with at least differential orientability and preferably full independent operability to provide greater roll and/or pitch moment control.

As described above, the stabilators 202, 204, and 206 depicted in FIG. 8 may be pivotably mounted on stabilator shafts 270 and/or movably mounted about the tail boom 310. They are preferably configured in the thrust plumes P1, P2, and P3 of the upstream thrusters 442, 444, and 446. The turbojets 422 and 424 preferably drive these thrusters and may drive additional thrusters to increase the air mass flow and improve efficiency. Such configurations provide the benefit of using jet thrusters, but direct the majority of the accelerated fluid as cooler plumes over the stabilators. They further group a plurality of jets and thrusters close to a fuselage or wing for ease of mounting while configuring cool thrusters upstream of multiple stabilators.

With reference to FIG. 11, in one exemplary embodiment, at least two and preferably three stabilators are provided in an inverted V or inverted Y configuration. For example, stabilator 202 may be configured vertically upward and mounted to rotate or move about stabilator shaft 270, which is movably mounted in the tail boom 310. Stabilators 204 and 206 are preferably positioned about 120 degrees apart at 120 degrees and 240 degrees from the Z axis. These stabilators 204 and 206 are preferably mounted in the fluid thrust plumes P1 and P2 downstream of thrusters 442 and 444, which are mounted on the aircraft.

With reference to FIG. 12, stabilators 204 and 206 may be pivotably mounted on stabilator shafts 270 on tail boom 310 (or preferably movably mounted), and positioned in the thrust plumes P2 and P3, which are directed downstream from thrusters 444 and 446 towards the stabilators (similar to FIG. 11). Stabilator 202 is preferably mounted on stabilator shaft 270, which is movably connected to tail boom 310 and positioned in the thrust plume P1 which is directed downstream of thruster 442. This positioning provides the further benefit of all three stabilators being able to contribute to enhanced control moments due to diversion of the thruster plumes.

Referring to FIG. 13, in another configuration, at least two and more preferably three stabilators are configured in an upright Y configuration. Here, the stabilators may be configured in a minor image of the configuration shown in FIG. 12 taken about a generally horizontal plane through the Y-Roll and X-Pitch axes. For example, the stabilators 202, 204 and 206 may be mounted on stabilator shafts 270, which are movably mounted out from a tail boom 310 about rotation vectors V1, V2, and V3 (not shown) at angles of 180, 300, and 60 degrees clockwise from the Z-axis. These stabilators are preferably positioned in the thrust plumes P1, P2, and P3, which are directed downstream from thrusters 442, 444, and 446.

With reference to FIG. 14, the configuration shown in FIG. 12 may be modified like that of FIG. 5 to incorporate the prime mover or jet thruster 422 within the tail boom 310. Preferably, three or more upstream thrusters 442, 444, and 446 are driven by the jet thruster 422 to increase the fluid mass flow, and correspondingly, reduce the relative air velocity to increase the propulsive efficiency. Three stabilators 202, 204, and 206 are preferably configured in the thrust plumes of the three upstream thrusters 442, 444, and 446. In this configuration, the jet thruster 422 forms a downstream hot jet plume J1 that does not impinge on the surrounding stabilators. The three thrusters provide relatively cool fluid plumes P1, P2, and P3 that flow over the stabilators to increase flow moment control while achieving long component life with conventional materials. This configuration avoids the shorter life and higher expense of forming the stabilator out of high temperature materials. With reference to FIG. 15, the configuration of FIG. 14 may be modified to move the tail boom jet 442 upstream and between left and right thrusters 444 and 446 and below tail boom 310. This arrangement is similar to the modification of the configuration of FIG. 5 to form that of FIG. 6. As before, the stabilators 202, 204, and 206 are configured in an inverted Y and are supported by the stabilator shafts 270, which are movably mounted about tail boom 310. The stabilators 202, 204, and 206 are preferably positioned within the thrust plumes P1, P2, and P3 of the respective upstream thrusters 442, 444, and 446, which are preferably driven by jet thruster 422. As with the configuration in FIG. 6, this configuration provides the benefit that most of the thrusted air or thrust plume comprises relatively cool air flow flowing over the stabilizers to increase control moments. The hot jet plume J1 from jet thruster is directed between and near stabilators 204 and 206. This may increase the entrained fluid flow across the stabilators while avoiding the primary hot gases in the jet plume J1 downstream of the jet thruster.

With reference to FIG. 16, the upright Y configuration of FIG. 13 is adapted by providing two jet thrusters on either side of the central stabilator 202 and below left and right stabilators 204 and 206, similar to the modifications used to form the configuration of FIG. 8. This arrangement conveniently configures jet thrusters with corresponding thrusters 442, 444, and 446 where they may be mounted about some combination of one or more fuselages, tail booms and wings. As before, the stabilators 202, 204, and 206 are preferably positioned in the thrust plumes of upstream thrusters 442, 444, and 446. The stabilators are kinematically coupled to the aircraft's rear section. For example, they may be supported by the stabilator shafts 270, which are movably mounted on a tail boom 310. The upstream jet thrusters 422 and 424 form hot jet plumes J1 and J2 between the stabilators 202 and 204, and 202 and 206, respectively. The entrained flow from the jet plumes J1 and J2 may increase the control moments generated by the three stabilators.

In a similar fashion, the three thruster and stabilator Y embodiments may be configured for other angles such that the stabilator 202 points to the right or to the left (90 degrees or 270 degrees clockwise from the Z-axis) or to another angle intermediate from the primary directions to form right, left and angled Y configurations, respectively. The stabilators 204 and 206 may be correspondingly configured in a Y configuration at their respective angles 120 degrees from the stabilator 202. The Y configurations provide more equal distribution of the reactive forces and moments for roll and/or pitch control compared to the T configurations. The more conventional (vertical) "rudder" stabilator 202 provides the primary Yaw control in the inverted T configuration. In the Y configurations, actuators for stabilators at an angle to the XY plane are preferably controlled together to provide up/down pitch control, and/or left/right yaw control. All three stabilators are preferably controlled together and angled in the same sense (clockwise or counter clockwise) about the central junction to provide counterclockwise or clockwise roll moments generally about the Y-Roll axis.

With reference to FIG. 17, the stabilators in the embodiment of FIG. 14 may be rearranged to form an inverted Delta configuration with an upper horizontal stabilator 202, an angled left stabilator 204, and an angled right stabilator 206. The configuration shown in FIG. 17 is shown in a schematic elevation view from the tail in FIG. 18. The stabilators 202, 204, and 206 are preferably configured in the thrust plumes P1, P2, and P3 of the upstream thrusters 442, 444, and 446, respectively. Further referring to FIG. 17 and FIG. 18, the three fluid thrusters 442, 444, and 446 are preferably configured about the central prime mover or jet thruster 422. This arrangement directs the hot jet plume J1 through the middle of the inverted Delta. This hot jet flow near the stabilators may provide some entrained flow to increase the control moments over the nearby stabilators without situating the stabilators within the hot jet plume J1. The prime mover or jet thruster 422 is preferably configured with a bypass propeller and/or fan. The four thruster fans may be driven by the turbojet. Preferably, two or more of the thrusters are driven by a second prime mover (not shown).

As before, the stabilators are supported and controlled by stabilator support shafts 270. These support shafts 270 are preferably movably mounted onto three stabilator support pods 922, 924, and 926, which are supported by three spars 902, 904, and 906. These spars may be connected to the tail boom 310, the wing or a similar part of the aircraft (not shown). The stabilator actuators may be configured within the stabilator support pods 922, 924, and 926, the corresponding support spars 902, 904, and 906 or tail boom 310. This configuration improves the structural support of the stabilators by providing two support arms per stabilator to form a strong tetrahedral configuration attached to the aircraft.

With reference to FIG. 20, the embodiment of FIG. 18 may be rotated 180 degrees generally about the Y-Roll axis to form an upright Delta configuration with a lower horizontal stabilator 202, an angled left stabilator 204, and an angled right stabilator 206. As before, the stabilators 202, 204, and 206 are preferably configured in the thrust plumes P1, P2, and P3 of the upstream thrusters 442, 444, and 446, respectively. Those thrusters are preferably configured about and driven by a central prime mover or jet thruster 422 so the hot jet plume J1 flows through the center of the upright Delta.

In a similar fashion, the three and four thruster, three stabilator Delta embodiments may be configured for other angles such that the stabilator 202 is vertical with the junction 204 to 206 pointing right or left to form right or left pointing Delta configurations. The Delta stabilators may similarly be configured at some other angle intermediate from the primary directions to form angled Delta configurations.

With reference to FIG. 19, the three outer thrusters of FIG. 17, FIG. 18, and/or FIG. 20 are preferably driven by the central prime mover or jet thruster and/or a second prime mover. This configuration may use a belt system with an appropriately sized pulley on each of the four thrusters to adjust the rotational speeds to improve system efficiency. The central prime mover and outer thrusters are preferably connected by durable belt drives 530, such as steel belt drives. The central drive pulley 522 and the driven thruster rotor pulleys 524 preferably have a relatively large diameter to minimize belt flexure. Such configurations can provide very long belt life and smooth operation across a very wide temperature range. In a similar manner, shaft drives with suitably configured gears may be used to drive the thrusters by the jet thruster.

With reference to FIG. 21, the three stabilator Delta configuration of FIG. 18 is preferably modified to form a four stabilator diamond configuration. An additional thruster is preferably added to provide five thrusters. For example, the central prime mover or jet thruster 422 is preferably mounted on the fuselage 300 surrounded by four thrusters 442, 444, 446, and 448 positioned about a square or box configuration, such as counterclockwise from the upper left. This configuration is shown in FIG. 22 in an elevation view from the aircraft tail. With further reference to FIG. 21 and FIG. 22, four stabilators 202, 204, 206, and 208 are preferably formed in a diamond configuration in the thrust plumes P1, P2, P3, and P4 downstream of the respective fluid thrusters 442, 444, 446, and 448. These are configured around the hot jet plume J1 of the central jet thruster 422. Each of the stabilators 202, 204, 206, and 208 is preferably supported and controlled by two stabilator support shafts 270, which may be movably mounted in respective stabilator support pods 922, 924, 926, and 928. These support pods may be supported by spars 902, 904, 906, and 908, respectively, which are mounted to the fuselage or similar support structure about or near the central jet thruster 422. These stabilators and support spars preferably form a strong four-sided pyramid.

With reference to FIG. 23, the four peripheral fluid thrusters of FIG. 21 are preferably driven by a central prime mover through a belt drive system. Strong durable belts driven by a relatively large pulley 522 are mounted on or proximate to the jet rotor. The drive pulley 522 drives belts 530 for driving the relatively larger driven pulleys 524.

With reference to FIG. 24, the five thruster diamond configuration of FIG. 22 may be rotated by 45 degrees clockwise (or counterclockwise) to form a similar five thruster, four stabilator box configuration. As before, four stabilators 202, 204, 206, and 208 are preferably configured in or divertably near the thrust plumes P1, P2, P3, and P4 of corresponding four upstream fluid thrusters 442, 444, 446, and 448. These thrusters are preferably configured around a central prime mover or jet thruster 422. The hot jet plume J1 flows through the middle of the box configuration between the four stabilators. The stabilators 202, 204, 206, and 208 are supported and controlled through stabilator supports 270, which are movably supported by stabilator support pods 922, 924, 926, and 928, respectively. These support pods are preferably attached to the aircraft through spars 902, 904, 906, and 908, respectively. This type of support is similar to the configuration in FIG. 21.

With reference to FIG. 25, four stabilators 202, 204, 206, and 208 may be pivotably or movably mounted on support shafts 270 in an X configuration in the thrust plumes P1, P2, P3, and P4 of the four fluid thrusters 442, 444, 446, and 448. Opposing pairs of stabilators may be oriented or operated in counter-clockwise or clockwise directions to provide clockwise or counter-clockwise roll moments. All four stabilators are preferably operated together to provide greater roll moments. A central prime mover or jet thruster 422 may be included, similar to the embodiment shown in FIG. 22. The central jet thruster 422 may be configured within the tail boom 310, such that the hot jet J1 is directed between the stabilators.

With reference to FIG. 26, the X configuration of FIG. 25 may be rotated by about 45 degrees about the longitudinal axis to form a cross configuration. Here, four stabilators 202, 204, 206, and 208 are positioned in or divertably near the downstream thrust plumes P1, P2, P3, and P4, respectively, of the four fluid thrusters 442, 444, 446, and 448, respectively. The stabilators are preferably movably supported by stabilator supports 270, which may be supported by a tail boom 310 within which the prime mover or the jet thruster 422 may be mounted. The hot jet plume J1 preferably flows between the four stabilators. Upper and lower stabilators are preferably oriented or operable to provide roll moments, and/or yaw moments. Similarly, left and right stabilators are preferably operable to provide roll moments and/or pitch moments. All four stabilators are more preferably operated together to provide greater overall roll moments.

With reference to FIG. 27, three stabilators are preferably configured downstream of three fluid thrusters in an inverted trident configuration. The stabilators are preferably kinematically coupled to the airplane's rear section. For example, they may be moveably mounted to the wing 40. The thrusters are attached to the aircraft, such as to the fuselage or to the wing 40. A left stabilator 204, central stabilator 202, and right stabilator 206 are preferably mounted in the thrust plumes P1, P2, and P3 of the respective fluid thrusters 442, 444, and 446. The stabilators 202, 204, and 206 are supported on each end by stabilator shafts 270. At their upper ends, the stabilator shafts 270 are movably mounted in a stabilator support pod 920. At their lower ends, the stabilator support shafts 270 are movably mounted on support mounts 902, 904, and 906, preferably supported by the aircraft's rear section. For example, These support mounts may be mounted on one of the wing 40 and the fuselage. The support pod 920 is preferably further reinforced by a spar 908, which connects to the aircraft, such as near the thruster 444. Two prime movers with thrusters 422 and 424 may be configured below the fluid thrusters and between the stabilators. For example, two jet thrusters are preferably mounted on the aircraft, such as to the wing 40 or fuselage (not shown).

Referring to FIG. 28, the five thruster, two jet trident stabilator configuration of FIG. 27 is shown in elevation view from the tail end of the aircraft. The hot jet plume J1 flows between the stabilators 202 and 204, and the hot jet plume J2 flows between the stabilators 202 and 206. The stabilators 204, 202, and 206 are preferably positioned in the thrust plumes P1, P2, and P3 of the respective fluid thrusters 442, 444, and 446. As before, the stabilators are kinematically coupled to the aircraft rear section. For example, stabilators may be supported and driven by stabilator arms 270, which are movably mounted in the stabilator support pod 920 and in the support spars 904, 902, and 906, which are mounted on one of the wing 40, the fuselage, and tail boom.

In a similar fashion, the three thruster and stabilator Trident configurations may be configured for other angles such that the base of the trident connecting stabilators 202, 204, and 206 points to the right or to the left, or to another angle intermediate from the primary directions to form right, left and angled Trident configurations. That is, the base may be oriented at the 90 degree, 270 degree, or other angle position, relative to the Z-Yaw axis.

The configuration of FIG. 15 may be modified to provide additional stabilizer mounts 270 out of the tips of stabilators 202, 204, and/or 206. These mounts are preferably movably provided on supports or spars to the tail boom 310 in a manner similar to the support mounts shown in FIG. 21, and FIG. 22. In this modification, the spars connecting the outer stabilator tips to the fuselage 300 or tail boom provide further structural support.

Referring to FIG. 31, the first or left stabilator 202 and the second or right stabilator 204 are preferably pivotably or otherwise movably mounted on stabilator supports 270 to stabilizer 176, which is attached to one or more tail booms 310, 312, and/or 314 in one embodiment. The upstream prime mover 422 mounted with the tail boom 310 powers thruster or propeller 442 to thrust or accelerate fluid or air to form a thrust plume P1 flowing over the downstream stabilators 202 and 204. The stabilators 202 and 204 are preferably angled outwardly away from the Z-Yaw axis by an angle of about plus fifteen degrees)(+15° and minus fifteen degrees)(−15°, respectively.

Referring to FIG. 32, the first or left stabilator 202 and the second or right stabilator 204 are preferably kinematically mounted with stabilator supports 270 to a stabilizer 176, or equivalently, to tail booms 312 and 314. The upper or outer ends of stabilators 202 and 204 are preferably movably mounted onto stabilator support pod 920 to form an Inverted V configuration. Two upstream prime movers 422 and 424, mounted on the wing 40, power thrusters or propellers 442 and 444 to thrust or accelerate air to form thrust plume P1 and P2, which flow over the downstream stabilators 202 and 204. The stabilators 202 and 204 are preferably angled inwardly from the base to the top by an angle of about minus fifteen degrees) (+15° and plus fifteen degrees, respectively)(−15° with respect to the vertical or Z Yaw axis. In some configurations, a third control surface 168 may be mounted at an angle to stabilators 202 and 204, as elevator 168 is pivotably or movably mounted parallel to the stabilizer 176.

Referring to FIG. 33, first or left stabilator 202 and second or right stabilator 204 may be pivotably mounted on stabilator supports 270 or movably mounted on delta wing 40, to form an Upright V configuration. Prime mover or jet thruster 422 may be mounted on the tail boom 310 between the stabilators to generate a jet plume J1 flowing between the stabilators. Preferably, first or left thruster 442 thrusts air to form plume P1 flowing over downstream stabilator 202. The second or right thruster 444 preferably thrusts air to form plume P2 flowing over downstream stabilator 204. The thrusters 442 and 444 may be driven by belts 530. In such Upright V configurations, two further control surfaces 168 and 172 may be provided with an angle to the control surfaces 202 and 204. For example, these control surfaces are preferably kinematically mounted as elevators onto delta wing 40. Each elevator 168 and 172 is preferably individually controllable in either direction about its instantaneous rotation vector. To provide a roll moment, elevators 168 and 172 are preferably controlled in opposite directions. These form roll moments generally in clockwise and counterclockwise directions generally about the Y-Roll axis.

Referring to FIG. 34, prime mover drive pulley 522 powers belts 530 to rotate thruster pulleys 524 to power thrusters 442 and 444 of FIG. 33, respectively. Equivalent drive shafts and gears may also be used. Prime movers may be used to individually drive thrusters 442 and 444.

With reference to FIG. 17 and FIG. 19, the plurality of fluid thrusters is driven by at least one prime mover. For example, three fluid thrusters 442, 444, and 446 may be driven by a prime mover, such as turbo jet 422. A pulley on the turbojet may drive three belts that in turn drive pulleys attached to the three fluid thrusters, respectively. Similarly, the turbojet 422 may be geared to propel three drive shafts (not shown) which may be geared (not shown) to drive the three thrusters 442, 444, and 446. The turbojet 422 is preferably configured with a propeller and/or fan to further increase the mass and momentum of the air being propelled to generate thrust. Similarly, referring to FIG. 21 and/or FIG. 23, the prime mover or turbojet 422 may drive four thrusters. The prime mover may be an internal combustion engine mounted on or in the aircraft (not shown) to similarly drive the thrusters through one or more belts or through geared shaft thruster drives or transmissions (not shown.) The internal combustion may be ignited by spark, compression or laser ignition. The prime mover may be a turbojet configured to similarly drive the fluid thrusters. One or more prime movers may comprise a fuel cell, a photovoltaic array and/or solar rectenna array driving an electric motor. They may also comprise a primary, or secondary battery, a capacitor and/or a flywheel that drives an electromagnetic motor. This arrangement may also include replaceable solid and/or liquid reactive components. Each of the thrusters may comprise a turbojet with a high bypass ratio propeller and/or fan mounted sufficiently upstream of the differentially and/or independently controlled surfaces so that a substantial degree of the surrounding air is entrained for generating vector forces on the controlled surfaces.

From the foregoing description, a novel empennage that is useful for controlling aircraft movement at relatively low air speeds has been disclosed. While the components, techniques and aspects of the invention have been described with a certain degree of particularity, many changes may be made in the specific designs, constructions, and methodology described above without departing from the spirit and scope of this disclosure.

Where thrusters and control surfaces are described relative to an aircraft, airplane or aeroplane, such embodiments also apply to Short/Vertical Take Off and Landing (S/VTOL), Short Take Off and Landing (STOL), and Vertical Take Off and Landing (VTOL) aircraft. They similarly apply to model airplanes, drones, and Unmanned Aerial Vehicles (UAVs).

Where angles, dimensions or relative positions are given, they are generally for illustrative purposes and are not prescriptive. Of course, as the skilled artisan will appreciate, other suitable angles, dimensions, relative dimensions, and energy conversion methods may be efficaciously utilized, as needed or desired, giving due consideration to the goals of achieving one or more of the benefits and advantages as taught or suggested herein.

Where propellers, fans, and/or jets have been described to accelerate a fluid and form thrust plumes and/or jet plumes, other fluid propulsion methods or combinations of such methods may be used. Other methods of accelerating fluid may also be used such as other aerodynamic or turbomachinery surface configurations, pulse detonation combustion jets and/or jet-fan combinations, electromagnetic motors, and/or magneto hydrodynamic converters. Where jets have been used for prime movers, other prime movers may readily be used such as reciprocating, opposed piston, or rotary engines comprising internal and/or external combustion engines. These engines may include spark, compression, light, laser or microwave ignition engines.

Where X, longitudinal, transverse, or other directions are referred to, the reader will appreciate that any general coordinate system using curvilinear coordinates may be utilized including Cartesian, cylindrical, annular, spherical, or other specialized system. Where one control surface, elevator and/or stabilator is described in a configuration, two or more control surfaces, elevators and/or stabilators configured in an array generally parallel to that control surface may be used.

Where thrusters are nominally described as configured about in line with the Y roll axis, other orientations may similarly be used. Additional thrusters may be provided beyond those described. Thrusters may be configured or be operable to provide one or more of forward, reverse, angled up, angled down, sideways left, sideways right thrust, and combinations of these. Where control surfaces are described to provide Pitch, and/or Yaw moments, control surfaces may be oriented or operated to provide combinations of two or more these control moments.

Various modifications and applications of the invention may occur to those who are skilled in the art, without departing from the true spirit or scope of the invention. It should be understood that the invention is not limited to the embodiments set forth herein for purposes of exemplification, but includes the full range of equivalency to which each element is entitled.

We claim:

1. A method for configuring an attitude control for an aircraft comprising:
    kinematically coupling a first control surface and a second control surface to an aircraft so the first and the second control surfaces are differentially moveable; and
    mounting a thruster to the aircraft at a position that enables thrusted air from the thruster to generate a first vector force on the first control surface, a second vector force generated by thrusted air on the second control surface, so that the first and the second vector forces provide a net roll moment about the Y-Roll axis.

2. The method of claim 1, the coupling of the first and the second control surfaces to the aircraft further comprising:
    mounting a first stabilizer to the aircraft; and
    kinematically coupling the first and the second control surfaces to the first stabilizer so the first and the second control surfaces are differentially moveable with respect to the first stabilizer.

3. The method of claim 1 further comprising:
mounting a second stabilizer to the aircraft; and
kinematically coupling a third control surface to the second stabilizer at a position that enables the thrusted air to generate a third vector force on the third control surface.

4. The method of claim 3, the kinematically coupling of the third control surface further comprising:
kinematically coupling a rudder to the second stabilizer.

5. The method of claim 3, the kinematically coupling of the first and the second control surfaces further comprises:
kinematically coupling first and second elevators to the first stabilizer.

6. The method of claim 1, the kinematically coupling of the first and the second control surfaces further comprises:
kinematically coupling a first stabilator and a second stabilator to the aircraft.

7. The method of claim 1 further comprising:
kinematically mounting a third control surface to the aircraft at a position that enables a thrust air to be directed at the third control surface.

8. A method for configuring an attitude control for an aircraft comprising:
mounting a plurality of thrusters to the aircraft;
kinematically coupling a first control surface to the aircraft;
kinematically coupling a second control surface to the aircraft to be differentially moveable with respect to the first control surface; and
positioning each of the thrusters to enable at least a portion of thrusted air from a thruster to be directed towards at least one of the first and the second control surfaces.

9. The method of claim 8 further comprising:
kinematically mounting a third control surface to the aircraft; and
the positioning of the thrusters further comprising:
positioning a first thruster to direct thrusted air towards the first control surface;
positioning a second thruster to direct thrusted air towards the second control surface; and
positioning a third thruster to direct thrusted air towards the third control surface.

10. The method of claim 8 further comprising:
positioning two thrusters to direct air towards the first control surface; and
positioning two thrusters to direct air towards the second control surface.

11. The method of claim 8 further comprising kinematically coupling a trim tab to one of the first control surface and the second control surface.

12. An aircraft attitude control configuration comprising:
a plurality of thrusters mounted to an aircraft for thrusting air;
a first control surface kinematically coupled to the aircraft at a position downstream of a first thruster to generate a first vector force on the first control surface by a portion of thrusted air from the first thruster; and
a second control surface kinematically coupled to the aircraft at a position downstream of a second thruster, the second control surface being differentially movable with respect to the first control surface to generate a second vector force on the second control surface by a portion of thrusted air from the second thruster to enable
the first and the second vector forces to provide a net roll moment about the Y-Roll axis.

13. The aircraft attitude control configuration of claim 12, further comprising:
a third control surface kinematically coupled to the aircraft to generate a third vector force on the third control surface by a portion of the thrusted air from in the plurality of thrusters.

14. The aircraft flight control configuration of claim 13, wherein the first control surface, the second control surface, and the third control surface are independently operable with respect to one another.

15. The aircraft attitude control configuration of claim 13, the plurality of thrusters further comprises:
a third thruster mounted to the aircraft and the third thruster and the third control surface are configured upstream and downstream of each other to generate the third vector force on the third control surface by a portion of thrusted air from the third thruster.

16. The aircraft attitude control configuration of claim 13, wherein one of the first, the second, and the third control surfaces is configured to generate the respective first, second, or third vector force by a portion of entrained air or thrusted air surrounding the thrusted air that is downstream of the cross section of the upstream thruster.

17. The aircraft attitude control configuration of claim 13, wherein the thrusters are configured to deliver thrusted air at a temperature below 293 degrees Celsius as the thrusted air flows past the respective downstream control surface.

18. The aircraft attitude control configuration of claim 12, wherein one of the first control surface and the second control surface is configured to position the first vector force or the second vector force, respectively, through a center of pressure on the respective control surface.

19. The aircraft attitude control configuration of claim 12, wherein one of the first control surface and the second control surface provides a reactive pressure differential force.

20. The aircraft attitude control configuration of claim 12, wherein one of the first control surface and the second control surface provides an active deflection of the thrusted air.

* * * * *